US006484140B2

(12) United States Patent
Matsumoto et al.

(10) Patent No.: US 6,484,140 B2
(45) Date of Patent: Nov. 19, 2002

(54) APPARATUS AND METHOD FOR ENCODING A SIGNAL AS WELL AS APPARATUS AND METHOD FOR DECODING SIGNAL

(75) Inventors: Jun Matsumoto, Kanagawa (JP); Masayuki Nishiguchi, Kanagawa (JP); Kenichi Makino, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/935,881

(22) Filed: Aug. 23, 2001

(65) Prior Publication Data

US 2002/0013703 A1 Jan. 31, 2002

Related U.S. Application Data

(62) Division of application No. 09/422,250, filed on Oct. 21, 1999.

(30) Foreign Application Priority Data

Oct. 22, 1998 (JP) .......................................... 10-301504
Oct. 22, 1998 (JP) .......................................... 10-319789
Oct. 22, 1998 (JP) .......................................... 10-319790

(51) Int. Cl.[7] ......................... G01L 19/14; G01L 19/10; G01L 19/00

(52) U.S. Cl. ....................... 704/230; 704/224; 704/219; 704/211

(58) Field of Search ................................ 704/230, 220, 704/221, 222, 203, 204

(56) References Cited

U.S. PATENT DOCUMENTS 5,684,920 A * 11/1997 Iwakami et al. ............ 704/220
5,749,065 A * 5/1998 Nishiguchi et al. ......... 704/222
5,806,024 A * 9/1998 Ozawa ........................ 704/221
6,104,994 A * 8/2000 Su et al. ...................... 704/233
6,141,639 A * 10/2000 Thyssen ...................... 704/220
6,205,423 B1 * 3/2001 Su et al. ...................... 704/209

* cited by examiner

*Primary Examiner*—Richemond Dorvil
*Assistant Examiner*—Daniel A Nolan
(74) *Attorney, Agent, or Firm*—Jay H. Maioli

(57) ABSTRACT

An apparatus and a method for encoding an input signal on the time base through orthogonal transform involves removing the correlation of signal waveform based on parameters obtained by linear predictive coding (LPC) analysis and pitch analysis of the input signal on the time base prior to the orthogonal transform. A normalization circuit section removes the correlation of the signal waveform and takes out the residue by an LPC inverse filter and pitch inverse filter and sends the residue to an orthogonal transform circuit section. The LPC parameters and the pitch parameters are sent to a bit allocation calculation circuit. A coefficient quantization section quantizes the coefficients from the orthogonal transform circuit section according to the number of allocated bits from the bit allocation calculation section.

8 Claims, 17 Drawing Sheets

APPARATUS AND METHOD FOR ENCODING A SIGNAL AS WELL AS APPARATUS AND METHOD FOR DECODING SIGNAL

This application is a division of application Ser. No. 09/422,250 filed Oct. 21, 1999.

BACKGROUND OF THE INVENTION

1. Field of the Invention

This invention relates to an apparatus and a method for encoding a signal by quantizing an input signal through time base/frequency base conversion as well as to an apparatus and a method for decoding an encoded signal. More particularly, the present invention relates to an apparatus and a method for encoding a signal that can be suitably used for encoding audio signals in a highly efficient way. It also relates to an apparatus and a method for decoding an encoded signal.

2. Prior Art

Various methods for encoding an audio signal are known to date including those adapted to compress the signal by utilizing statistic characteristics of audio signals (including voice signals and music signals) in terms of time and frequency and characteristic traits of the human hearing sense. Such coding methods can be roughly classified into encoding in the time region, encoding in the frequency region and analytic/synthetic encoding.

In the operation of transform coding of encoding an input signal on the time base by orthogonally transforming it into a signal on the frequency base, it is desirable from the viewpoint of coding efficiency that the characteristics of the time base waveform of the input signal are removed before subjecting it to transform coding.

Additionally, when quantizing the coefficient data on the orthogonally transformed frequency base, the data are more often than not weighted for bit allocation. However, it is not desirable to transmit the information on the bit allocation as additional information or side information because it inevitably increases the bit rate.

In view of these circumstances, it is therefore an object of the present invention to provide an apparatus and a method for encoding a signal that are adapted to remove the characteristic or correlative aspects of the time base waveform prior to orthogonal transform in order to improve the coding efficiency and, at the same time, reduce the bit rate by making the corresponding decoder able to know the bit allocation without directly transmitting the information on the bit allocation used for the quantizing operation.

Meanwhile, for the operation of transform coding of encoding an input signal on the time base by orthogonally transforming it into a signal on the frequency base, techniques have been proposed to quantize the coefficient data on the frequency base by dynamically allocating bits in response to the input signal in order to realize a low coding rate. However, cumbersome arithmetic operations are required for the bit allocation particularly when the bit allocation changes for each coefficient in the operation of dividing coefficient data on the frequency base in order to produce sub-vectors for vector quantization.

Additionally, the reproduced sound can become highly unstable when the bit allocation changes extremely for each frame that provides a unit for orthogonal transform.

In view of these circumstances, it is therefore another object of the present invention to provide an apparatus and a method for encoding a signal that are adapted to dynamically allocate bits in response to the input signal with simple arithmetic operations for the bit allocation and reproduce sound without making it unstable if the bit allocation changes remarkably among frames for the operation of encoding the input signal that involves orthogonal transform as well as an apparatus and a method for decoding a signal encoded by such an apparatus and a method.

Additionally, since quantization takes place after the bit allocation for the coefficient on the frequency base such as the MDCT coefficient in the operation of transform coding of encoding an input signal on the time base by orthogonally transforming it into a signal on the frequency base, quantization errors spreads over the entire orthogonal transform block length on the time base to give rise to harsh noises such as pre-echo and post-echo. This tendency is particularly remarkable for sounds that relatively quickly attenuate between pitch peaks. This problem is conventionally addressed by switching the transform window size (so-called window switching). However, this technique of switching the transform window size involves cumbersome processing operations because it is not easy to detect the right window having the right size.

In view of the above circumstances, it is therefore still another object of the present invention to provide an apparatus and a method for encoding a signal adapted to reduce harsh noises such as pre-echo and post-echo without modifying the transform window size as well as an apparatus and a method for decoding a signal encoded by such an apparatus and a method.

SUMMARY OF THE INVENTION

According to a first aspect of the invention, the above objectives are achieved by providing a method for encoding an input signal on the time base through orthogonal transform, said method comprising:

a step of removing the correlation of signal waveform on the basis of the parameters obtained by means of linear predictive coding (LPC) analysis and pitch analysis of the input signal on the time base prior to the orthogonal transform.

Preferably, the input time base signal is transformed to coefficient data on the frequency base by means of modified discrete cosine transform (MDCT) in said orthogonal transform step. Preferably, in said normalization step, the LPC analysis residue of said input signal is output on the basis of the LPC coefficient obtained through LPC analysis of said input signal and the correlation of the pitch of said LPC prediction residue is removed on the basis of the parameters obtained through pitch analysis of said LPC prediction residue. Preferably, said quantization means quantizes according to the number of allocated bits determined on the basis of the outcome of said LPC analysis and said pitch analysis.

According to a second aspect of the invention, there is provided a method for encoding an input signal on the time base through orthogonal transform, said method comprising:

a calculating step of calculating weights as a function of said input signal; and a quantizing step of determining an order for the coefficient data obtained through the orthogonal transform according to the order of the calculated weights and carrying out an accurate quantizing operation according to the determined order.

Preferably, in said quantizing step, a larger number of allocated bits are used for quantization for the coefficient data of a higher order.

Preferably, the coefficient data obtained through said orthogonal transform are divided into a plurality of bands on the frequency base and the coefficient data of each of the bands are quantized according to said determined order of said weights independently from the remaining bands.

Preferably, the coefficient data of each of the bands are divided into a plurality of groups in the descending order of the bands to define respective coefficient vectors and each of the obtained coefficient vectors is subjected to vector quantization.

According to a third aspect of the invention, there is provided a method for encoding an input signal on the time base through orthogonal transform on a frame by frame basis, each frame providing a coding unit, said method comprising:

an envelope extracting step of an extracting envelope within each frame of said input signal; and a gain smoothing step of carrying out a gain smoothing operation on said input signal on the basis of the envelope extracted by said envelope extracting step and supplying the input signal for said orthogonal transform.

Preferably, the input time base signal is transformed to coefficient data on the frequency base by means of modified discrete cosine transform (MDCT) for said orthogonal transform. Preferably, the information on said envelope is quantized and output. Preferably, said frame is divided into a plurality of sub-frames and said envelope is determined as the root means square (rms) value of each of the divided sub-frames. Preferably, the rms value of each of the divided sub-frames is quantized and output.

Thus, according to the first aspect of the invention, there is provided a method for encoding an input signal on the time base through orthogonal transform, said method comprising:

a step of removing the correlation of signal waveform on the basis of the parameters obtained by means of linear predictive coding (LPC) analysis and pitch analysis of the input signal on the time base prior to the orthogonal transform.

With this arrangement, a residual signal that resembles a white nose is subjected to orthogonal transform to improve the coding efficiency. Additionally, in a method for encoding an input signal on the time base through orthogonal transform, preferably a quantization operation is conducted according to the number of allocated bits determined on the basis of the outcome of said linear predictive coding (LPC) analysis and said pitch analysis. Then, the corresponding decoder is able to reproduce the bit allocation of the encoder from the parameters of the LPC analysis and the pitch analysis to make it possible to suppress the rate of transmitting side information and hence the overall bit rate and improve the coding efficiency.

Still additionally, the operation of encoding high quality audio signals can be carried out highly efficiently by using a technique of modified discrete cosine transform (MDCT) for orthogonal transform.

According to the second aspect of the invention, there is provided a method for encoding an input signal on the time base through orthogonal transform, said method comprising:

a calculating step of calculating weights as a function of said input signal; and a quantizing step of determining an order for the coefficient data obtained through the orthogonal transform according to the order of the calculated weights and carrying out an accurate quantizing operation according to the determined order.

With this arrangement, it is possible to dynamically allocate bits in response to the input signal with simple arithmetic operations for calculating the number of bits to be allocated to each coefficient.

Particularly, when the coefficient data obtained through said orthogonal transform are divided into a plurality of sub-vectors, the number of bits to be allocated to each sub-vector can be determined by calculating the weight for it to reduce the arithmetic operations if the number of bits to be allocated to each coefficient changes because the coefficient data can be reduced into sub-vectors after they are sorted out according to the descending order of the weights.

Additionally, when the coefficient data on the frequency base are divided into bands and the number of bits to be allocated to each band is predetermined, any possible abrupt change in the quantization distortion can be prevented from taking place to reproduce sound on a stable basis if the weight of each coefficient change extremely from frame to frame because the number of allocated bits is reliable determined for each band.

Still additionally, when the parameters to be used for the arithmetic operations of bit allocation are predetermined and transmitted to the decoder, it is no longer necessary to transmit the information on bit allocation to the decoder so that it is possible to suppress the rate of transmitting side information and hence the overall bit rate and improve the coding efficiency. Still additionally, the operation of encoding high quality audio signals can be carried out highly efficiently by using a technique of modified discrete cosine transform (MDCT) for orthogonal transform.

According to the third aspect of the invention, there is provided a method for encoding an input signal on the time base through orthogonal transform on a frame by frame basis, each frame providing a coding unit, said method comprising:

an envelope extracting step of an extracting envelope within each frame of said input signal; and a gain smoothing step of carrying out a gain smoothing operation on said input signal on the basis of the envelope extracted by said envelope extracting step and supplying the input signal for said orthogonal transform.

With this arrangement, it is possible to reduce harsh noises such as pre-echo and post-echo without modifying the transform window size as in the case of the prior art.

Additionally, when the information on said envelope is quantized and output to the decoder and the gain is smoothed by using the quantized envelope value, the decoder can accurately restore the gain.

Still additionally, the operation of encoding high quality audio signals can be carried out highly efficiently by using a technique of modified discrete cosine transform (MDCT) for orthogonal transform.

DETAILED DESCRIPTION OF THE INVENTION

Now, the present invention will be described in greater detail by referring to the accompanying drawings that illustrate preferred embodiments of the invention.

Figure 1A:
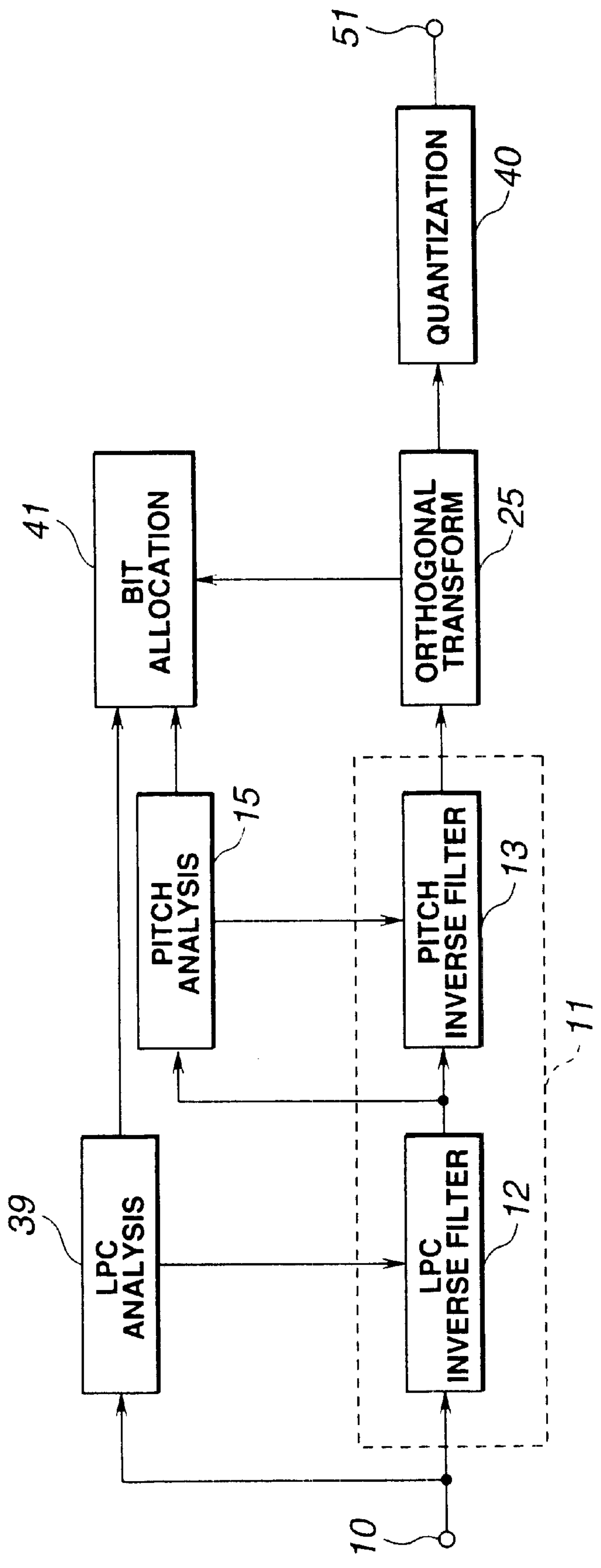
FIG. 1A is a schematic block diagram of an embodiment of encoder according to the first aspect of the invention.

FIG. 1A is a schematic block diagram of an embodiment of encoder according to the first aspect of the invention.

Referring to FIG. 1A, a waveform signal on the time base such as a digital audio signal is applied to input terminal 10. While a specific example of such a digital audio signal may be a so-called broad band sound signal with a frequency band between 0 and 8 kHz and a sampling frequency Fs of 16 kHz, although the present invention is by no means limited thereto.

The input signal is then sent from the input terminal 10 to normalization circuit section 11. The normalization circuit section 11 is also referred to as whitening circuit and adapted to carry out a whitening operation of extracting characteristic traits of the input temporal waveform signal and taking out the prediction residue. A temporal waveform can be whitened by way of linear or non-linear prediction. For example, an input temporal waveform signal can be whitened by way of LPC (linear predictive coding) analysis and pitch analysis.

Referring to FIG. 1A, the normalization (whitening) circuit section 11 comprises an LPC inverse filter 12 and a pitch inverse filter 13. The input signal entered through the input terminal 10 is sent to the LPC analysis circuit 39 for LPC analysis and the LPC coefficients (so-called $\alpha$ parameters) obtained as a result of the analysis are sent to the pitch inverse filter 13 in order to take out the processing residue. The LPC prediction residue from the LPC inverse filter 12 is then sent to pitch analysis circuit 15 and the pitch inverse filter 13. The pitch parameters are taken out by the pitch analysis circuit 15 by way of pitch analysis, which will be described hereinafter, and the pitch correlation is removed by the pitch inverse filter 13 from said LPC predictive residue to obtain the pitch residue, which is then sent to the orthogonal transform circuit 25. The LPC coefficients from the LPC analysis circuit 39 and the pitch parameters from the pitch analysis circuit 15 are then sent to bit allocation calculating circuit 41, which is adapted to determine the bit allocation for the purpose of quantization.

The whitened temporal waveform signal, which is the pitch residue of the LPC rotary speed, sent from the normalization circuit section 11 is by turn sent to orthogonal transform circuit section 25 for time base/frequency base transform (T/F mapping), where it is transformed into a signal (coefficient data) on the frequency base). Techniques that are popularly used for the T/F mapping include DCT (discrete cosine transform), MDCT (modified discrete cosine transform) and FFT (fast Fourier transform). The parameters, or the coefficient data, such as the MDCT coefficients or the FFT coefficients obtained from the orthogonal transform circuit section 25 are then sent to the coefficient quantizing section 40 for SQ (scalar quantization) or VQ (vector quantization). It is necessary to determine a bit allocation for each coefficient for the purpose of quantization if the operation of coefficient quantization is to be carried out efficiently. The bit allocation can be determined on the basis of a hearing sense masking model, various parameters such as the LPC coefficients and pitch parameters obtained as a result of the whitening operation of the normalization circuit section 11 or the Bark scale factors calculated from the coefficient data. The Bark scale factor typically include the peak values or the rms (root mean square) values of each critical band obtained when the coefficients determined as a result of the orthogonal transform are divided to critical bands, which are frequency bands wherein a greater band width is used for a higher frequency band to correspond to the characteristic traits of the human hearing sense.

In this embodiment, the bit allocation is defined in such a way that it is determined only on the basis of LPC coefficients, pitch parameters and Bark scale factors so that the decoder can reproduce the bit allocation of the encoder when the former receives only these parameters. Then, it is no longer necessary to transmit additional information (side information) including the number of allocated bits and hence the transmission bit rate can be reduced significantly.

Note that quantized values are used for the LPC coefficients (a parameters) to be used in the LPC inverse filter and the (pitch gains of) the pitch parameters to be used in the pitch inverse filter 13 from the viewpoint of the reproducibility of the decoder.

Figure 1B:
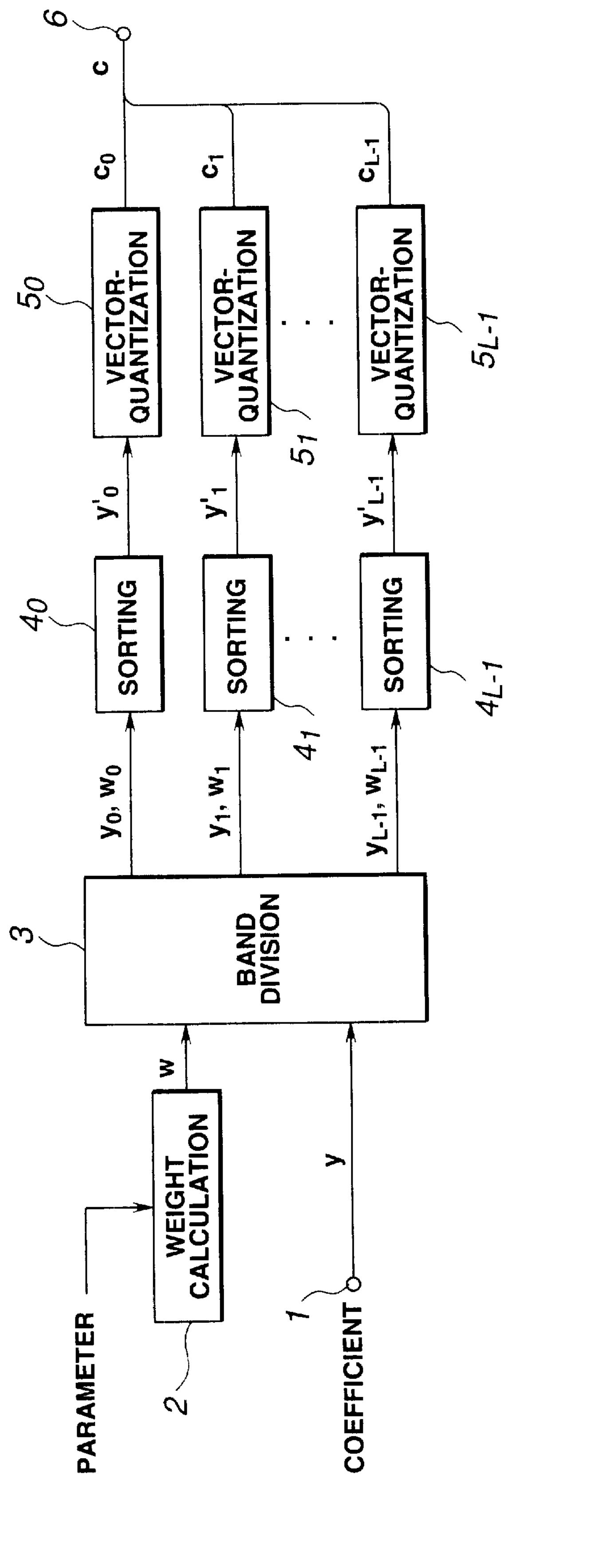
FIG. 1B is a schematic block diagram of a quantization circuit that can be used for an embodiment of encoder according to the second aspect of the invention.

FIG. 1B is a schematic block diagram of a quantization circuit that can be used for an embodiment of encoder according to the second aspect of the invention.

Referring to FIG. 1B, input terminal 1 is fed with the coefficient data on the frequency base obtained by orthogonally transforming a time base signal and weight calculation circuit 2 is fed with parameters such as LPC coefficients, pitch parameters and Bark scale factors. The weight calculation circuit 2 calculates weights w on the basis of such parameters. In the following description, the coefficients of a frame of orthogonal transform is expressed by vector y and the weights of a frame of orthogonal transform is expressed by vector w.

The coefficient vector y and the weight vector w are then sent to band division circuit 3, which divides them among L (L≧1) bands. The number of bands may typically be three (L=3) including a low band, a middle band and a high band, although the present invention is by no means limited thereto. It is also possible not to divide them among bands for the purpose of the invention. If the coefficient vector and the weight vector of the k-th band are $y_k$ and $w_k$ respectively (0≦k≦L−1), the following formulas are obtained.

$$y=(y_0, y_1, \ldots, y_{L-1})$$

$$w=(w_0, w_1, \ldots, w_{L-1})$$

The number of bands used for dividing the coefficients and the weights and the number of coefficients of each band are set to predetermined respective values.

Then, the coefficient vectors=$y_0, y_1, \ldots, y_{L-1}$ are sent to respective sorting circuits $\mathbf{4}_0, \mathbf{4}_1, \ldots, \mathbf{4}_{L-1}$ and the coefficients in each band is provided with respective order numbers in the descending order of the weights. This operation may be carried out either by rearranging (sorting) the coefficients themselves in the band in the descending order of the weights or by sorting the indexes of the coefficients indicating their respective positions on the frequency base in the descending order of the weights and determining the accuracy level (the number of allocated bits) of each coefficient to reflect the sorted index of the coefficient at the time of quantization. When rearranging the coefficients themselves, the coefficient vector $y'_k$ whose coefficient s are sorted in the descending order of the weights can be obtained by sorting the coefficients of the coefficient vector $y_k$ of the k-th band in the descending order of the weights.

Then, the coefficient vectors $y_0, y_1, \ldots, y_{L-1}$, the coefficients of each of which are sorted in the descending order of the weights of the band, are then sent to respective vector quantizers $\mathbf{5}_0, \mathbf{5}_1 \ldots, \mathbf{5}_{L-1}$, where they are subjected to respective operations of vector-quantization.

Then, the vectors $c_0, c_1, \ldots, c_{L-1}$ of the coefficient indexes of the bands sent from the respective vector quantizers $\mathbf{5}_0, \mathbf{5}_1, \ldots, \mathbf{5}_{L-1}$ are collectively taken out as vector c of the coefficient indexes of all the bands.

The operation of the quantization circuit of FIG. 1B will be described in greater detail by referring to FIGS. 7 and 8.

With the above arrangement, the coefficients that are sorted in the descending order of the weights can be sequentially subjected to respective operations of vector-quantization if the weights of the coefficients of each frame change dynamically so that the process of bit allocation can be significantly simplified. Additionally, if the number of bits allocated to each band is fixed and hence invariable, then sound can be reproduced on a stable basis even if weights changes significantly among frames for the signal.

Figure 1C:
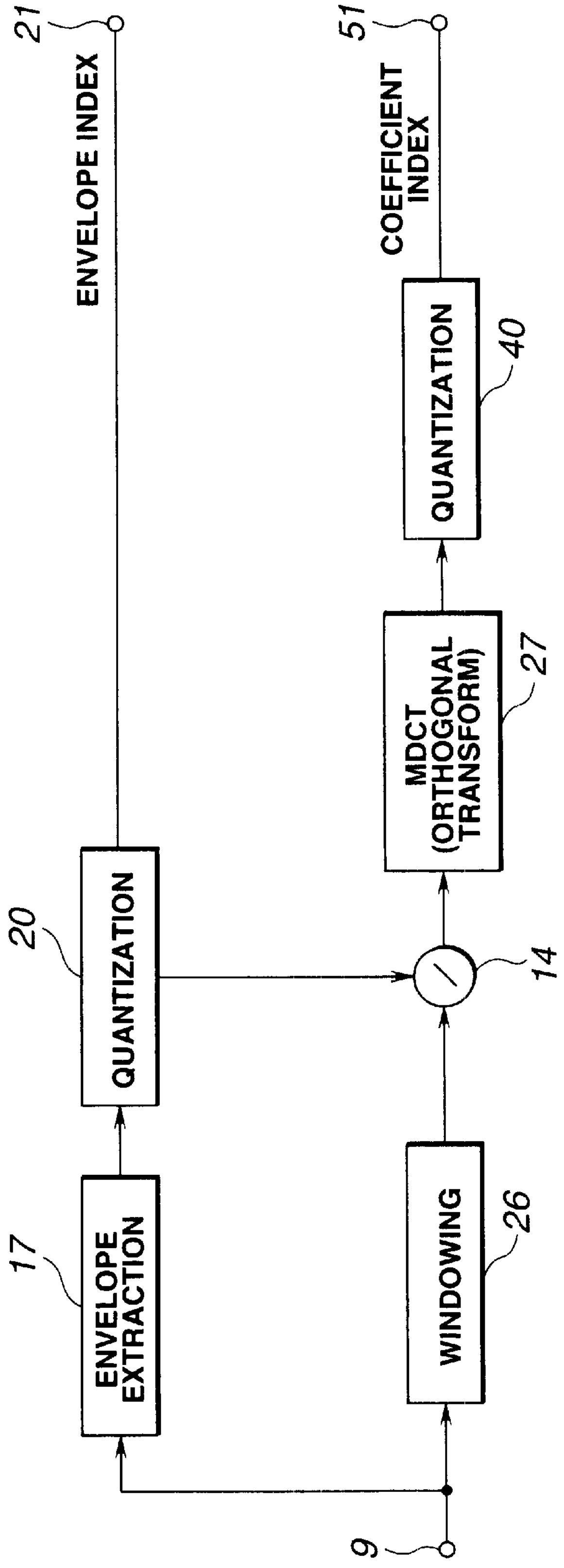
FIG. 1C is a schematic block diagram of an embodiment of encoder according to the third aspect of the invention.

FIG. 1C is a schematic block diagram of an embodiment of encoder according to the third aspect of the invention.

Referring to FIG. 1C, a waveform signal on the time base, which is typically a digital audio signal, is entered to input terminal 9. While a specific example of such a digital audio signal may be a so-called broad band sound signal with a frequency band between 0 and 8 kHz and a sampling frequency Fs of 16 kHz, although the present invention is by no means limited thereto. The prediction residue obtained by extracting characteristic traits of a temporal waveform signal by means of a normalization circuit (whitening circuit) may be used for the time base input signal.

The signal from the input terminal 9 is then sent to envelope extraction circuit 17 and windowing circuit 26. The envelope extraction circuit 17 extracts envelopes within each frame that operates as a coding unit of MDCT (modified discrete cosine transform) circuit 27, which is an orthogonal transform circuit. More specifically, it divides a frame into a plurality of sub-frames and calculates the root mean square (rms) for each sub-frame as envelope. The obtained envelope information is quantized by the quantizer 20 and the obtained index (envelope index) is taken out from output terminal 21 and sent to the decoder.

In the windowing circuit 26 an window-placing operation is carried out by means of a window function that can utilize aliasing cancellation of MDCT through 1/2 overlapping. The output of the windowing circuit 26 is divided by divider 14 that operates as gain smoothing means, using the value of the envelope quantized by the quantizer 20 as divisor. Then, the obtained quotient is sent to the MDCT circuit 27. The quotient is transformed into coefficient data (MDCT coefficients) on the frequency base by the MDCT circuit 27 and the obtained MDCT coefficients are quantized by quantization circuit section 40 and the indexes of the quantized MDCT coefficients are then taken out from output terminal 51 and sent to the decoder. Note that the orthogonal transform is not limited to MDCT for the purpose of the invention.

With the above arrangement, a noise shaping process proceeds along the time base so that quantized noises that is harsh to the ear such as pre-echo can be reduced without switching the transform widow size.

While the embodiments of signal encoder of FIGS. 1A, 1B and 1C are illustrated as hardware, they may alternatively be realized as software by means of a so-called DSP (digital signal processor).

Now, the present invention will be described in greater detail by way of a specific example illustrated in FIG. 2, which is an audio signal encoder.

Figure 2:
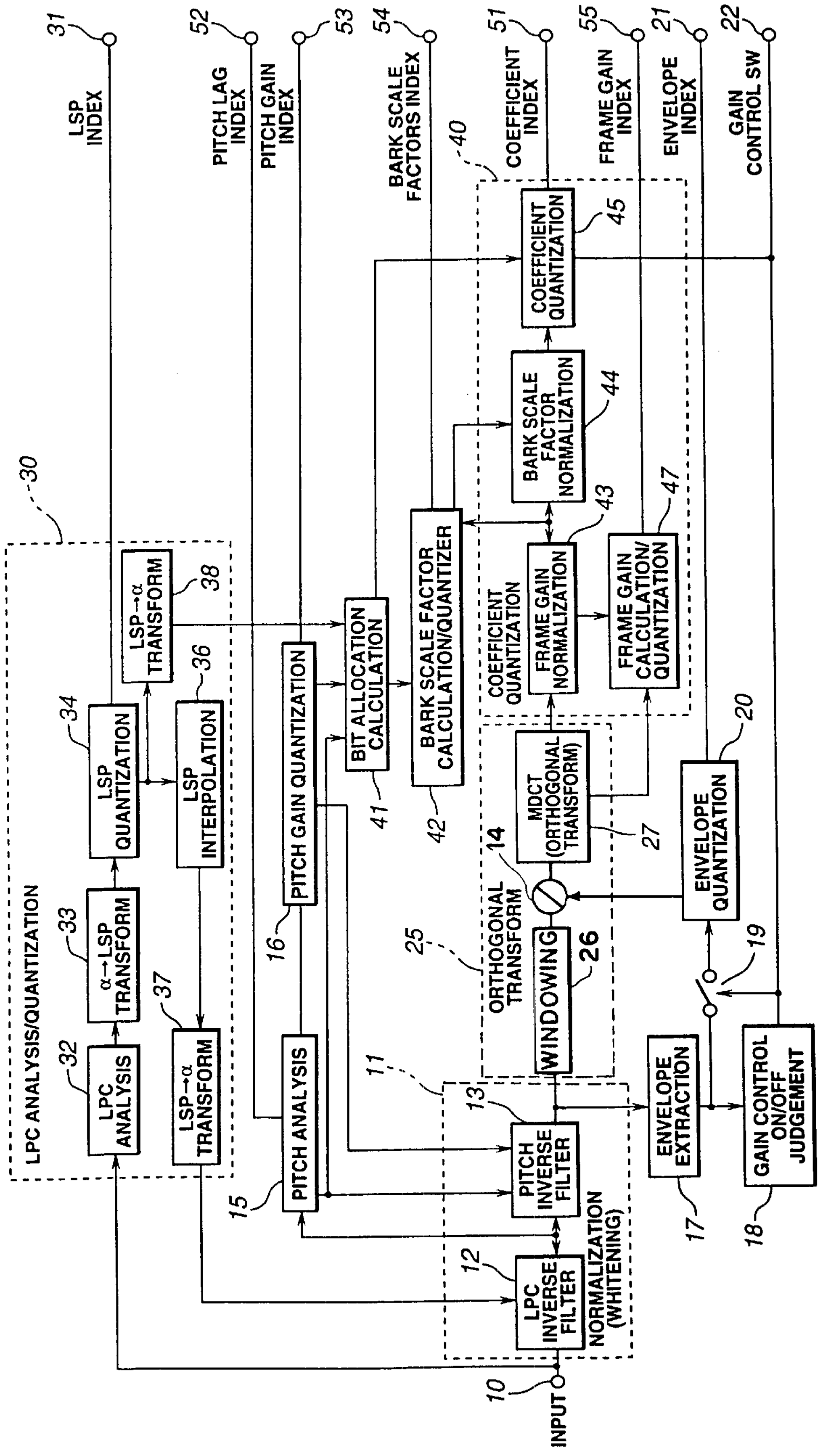
FIG. 2 is a schematic block diagram of an audio signal encoder, which is a specific embodiment of the invention.

The audio signal encoder of FIG. 2 is adapted to carry out an operation of time base/frequency base transform (T/F transform), which may be MDCT (modified discrete cosine transform), on the supplied time base signal by means of the orthogonal transform section 2. In the illustrated example, characteristic traits of the input signal waveform of the time base signal are extracted by way of LPC analysis, pitch analysis and envelope extraction before the orthogonal transform and the parameters expressing the extracted characteristic traits are independently quantized and taken out. Then, the parameters expressing the characteristic traits are quantized separately and taken out. Subsequently, the characteristic traits and the correlation of the signal are removed by the normalization (whitening) circuit section 11 to produce a noise-like signal that resembles white noise in order to improve the coding efficiency.

The LPC coefficients obtained by the above LPC analysis and the pitch parameters obtained by the above pitch analysis are used for determining the bit allocation for the purpose of quantization of coefficient data after the orthogonal transform. Additionally, Bark scale factors obtained as normalization factors by taking out the peak values and the rms values of the critical bands on the frequency base may also be used. In this way, the weights to be used for quantizing the orthogonal transform coefficient data such as MDCT coefficients are computationally determined by means of the LPC coefficients, the pitch parameters and the Bark scale factors and then bit allocation is determined for all the bands to quantize the coefficients. When the weights to be used for quantization are determined by preselected parameters such as LPC coefficients, pitch parameters and Bark scale factors as described above, the decoder can exactly reproduce the bit allocation of the encoder simply by receiving the parameters so that it is no longer necessary to transmit the side information on the bit allocation per se.

Additionally, when quantizing coefficients, the coefficient data are rearranged (sorted) in the order of the weights or the allocated numbers of bits to be used for the quantizing operation in order to sequentially and accurately quantize the coefficient data. This quantizing operation is preferably carried out by dividing the sorted coefficients sequentially from the top into sub-vectors so that the sub-vectors may be quantizes independently. While the coefficient data of the entire band may be sorted, they may alternatively be divided into a number of bands so that the sorting operation may be carried out on a band by band basis. Then, only if the parameters to be used for the bit allocation are preselected, the decoder can exactly reproduce the bit allocation and the sorting order of the encoder by receiving the parameters and not receiving the information on the bit allocation and the positions of the sorted coefficients.

Referring to FIG. 2, a digital audio signal obtained by A/D transforming a broad band audio input signal with a frequency band typically between 0 and 8 kHz, using a sampling frequency Fs=16 kHz, is applied to the input terminal 10. The input signal is sent to LPC inverse filter 12 of normalization (whitening) circuit section 11 and, at the same time, taken by every 1024 samples, for example, and sent to LPC analysis/quantization section 30. The LPC analysis/quantization section 30 carries out a hamming/window-placing operation on the input signal and computationally determines LPC coefficients of the 20th order or so, which are α parameters, so that the LPC residue may be obtained by the LPC inverse filter 11. During this operation of LPC analysis, part of the 1024 samples of a frame that provide a unit of analysis, e.g., a half of them or 512 samples, are made to overlap the next block to make the frame interval equal to 512 samples. This arrangement is used to utilize the aliasing cancellation of the MDCT employed for the subsequent orthogonal transform. The LPC analysis/quantization section 30 is adapted to transmit the α parameters, which are LPC coefficients, after transforming them into LSP (linear spectral pair) parameters and quantizing them.

The α parameters from LPC analysis circuit 32 are sent to α→LSP transform circuit 33 and transformed into linear spectral pair (LSP) parameters. This circuit transforms the α parameters obtained as direct type filter coefficients into 20, or 10 pairs of, LSP parameters. This transforming operation is carried out typically by means of the Newton-Rapson method. This operation of transforming α parameters into LSP parameters is carried out because the latter are more excellent than the former in terms of interpolation effect.

The LSP parameters from the α→LSP transform circuit 33 are vector-quantized or matrix-quantized by LSP quantizer 34. At this time, they may be subjected to vector-quantization after determining the inter-frame differences or the LSP parameters of a plurality of frames may be collectively matrix-quantized.

The quantized output of the LSP quantizer 34 are the indexes of the LSP vector-quantization and taken out by way of terminal 31, whereas the quantized LSP vectors or the inverse quantization outputs are sent to LSP interpolation circuit 36 and LSP→α transform circuit 38.

The LSP interpolation circuit 36 interpolates the immediately preceding frame and the current frame of the LSP vector quantized by the LSP quantizer 34 on a frame by frame basis to obtain the rate required in subsequent processing steps. In this embodiment, it operates for interpolation at a rate 8 times as high as the original rate.

Then, the LSP→α transform circuit 37 transforms the LSP parameters into a parameters that are typically coefficients of the 20th order of a direct type filer in order to carry out an inverse filtering operation of the input sound by means of the interpolated LSP vector. The output of the LSP→α transform circuit 37 is then sent to LPC inverse filter circuit 12 adapted to determine the LPC residue. The LPC inverse filter circuit 12 carries out an inverse filtering operation by means of the α parameters that are updated at a rate 8 times as high as the original rate in order to produce a smooth output.

On the other hand, the LSP coefficients that are sent from the LSP quantization circuit 34 and updated at the original rate are sent to LSP→α transform circuit 38 and transformed into α parameters, which are then sent to bit allocation determining circuit 41 for determining the bit allocation. The bit allocation determining circuit 41 also calculates the weights w(ω) to be used to quantizing MDCT coefficients as will be described hereinafter.

The output from the LPC inverse filter 12 of the normalization (whitening) circuit section 11 is then sent to the pitch inverse filter 13 and the pitch analysis circuit 15 for pitch prediction, that is a long term prediction.

Now, a long term prediction will be discussed below. A long term prediction is an operation of determining the pitch prediction residue which is the difference obtained by subtracting the waveform displaced on the time base by a pitch period or a pitch lag obtained as a result of pitch analysis from the original waveform. In this example, a technique of three-point prediction is used for the long term prediction. The pitch lag refers to the number of samples corresponding to the pitch period of the sampled time base data.

Thus, the pitch analysis circuit 15 carries out a pitch analysis once for every frame to make the analysis cycle equal to a frame. The pitch lag obtained as a result of the pitch analysis is sent to the pitch inverse filter 13 and the bit allocation determining circuit 41, while the obtained pitch gain is sent to pitch gain quantizer 16. The pitch lag index obtained by the pitch analysis circuit 15 is taken out from terminal 52 and sent to the decoder.

The pitch gain quantizer 16 vector-quantizes the pitch gains obtained at three points corresponding to the above three-point prediction and the obtained code book index (pitch gain index) is taken out from output terminal 53. Then, the vector of the representative value or the inverse quantization output is sent to the pitch inverse filter 13. The pitch inverse filter 13 output the pitch prediction residue of the three-point prediction on the basis of the above described pitch analysis. The pitch prediction residue is sent to the divider 14 and the envelope extraction circuit 17.

Now, the pitch analysis will be described further. In the pitch analysis, pitch parameters are extracted by means of the above LPC residue. A pitch parameter comprises a pitch lag and a pitch gain.

Firstly, the pitch lag will be determined. For example, a total of 512 samples are cut out from a central portion of the LPC residue and expressed by x(n) (n=0~511) or x. If the 512 samples of the k-th LPC residue as counted back from the current LPC residue is expressed by $x_k$, the pitch k is defined as a value that minimizes $$\|x-gx_{1k}\|^2.$$

Thus, if $$g=(x,\ x_k)^2/\|x_k\|^2,$$

an optimal lag K can be obtained by searching for k that maximizes $$(x,\ x_k)^2/\|x_k\|^2.$$

In this embodiment, 12≦K≦240. This K may be used directly or, alternatively, a value obtained by means of a tracking operation using the pitch lag of past frames may be used. Then, by using the obtained K, an optimal pitch gain will be determined for each of three points (K, K−1, K+1). In other words, $g_{-1}$, $g_0$ and $g_1$ that minimize $$\|x-(g_{-1}x_{L+1}+g_0X_L+g_1x_{L-1})\|^2$$

will be determined and selected as pitch gains for the three points. The pitch gains of the three points are sent to the pitch gain quantizer 16 and collectively vector-quantized. Then, quantized pitch gain and the optimal lag K are used for the pitch inverse filter 13 to determine the pitch residue. The obtained pitch residue is linked to the past pitch residues that are already known and then subjected to an MDCT transform operation as will be discussed in greater detail hereinafter. The pitch residue may be held under time base gain control prior to the MDCT transform.

Figure 3:
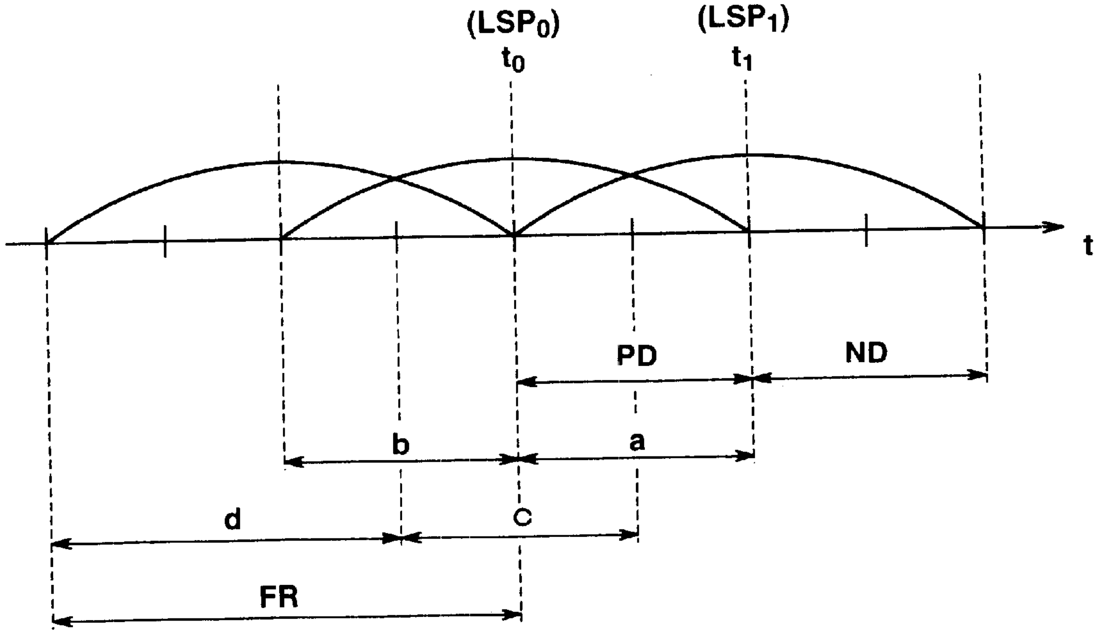
FIG. 3 is a schematic illustration of the relationship between an input signal and an LPC analysis and a pitch analysis conducted for it.

FIG. 3 is a schematic illustration of the relationship between an input signal and an LPC analysis and a pitch analysis conducted for it. Referring to FIG. 3, the analysis cycle of a frame FR, from which 1,024 samples may be taken, has a length corresponding to an MDCT transform block. In FIG. 3, time $t_1$ indicates the center of the current and new LPC analysis ($LSP_1$) and time $t_0$ indicates the center of the LPC analysis ($LSP_0$) of the immediately preceding frame. The latter half of the current frame contains new data ND, whereas the former half of the current frame contains previous data PD. In FIG. 3, a denotes the LPC residue obtained by interpolating $LSP_0$ and $LSP_1$ and b denotes the LPC residue of the immediately preceding frame, while c denotes the new pitch residue obtained by the pitch analysis using this portion (latter half of b+former half of a) as object and d denotes the pitch residue of the past. Referring to FIG. 3, a can be determined at the time when all the new data ND are input and the new pitch residue c can be computationally determined from a and b that is already known. Then, the data FR of the frame to be subjected to orthogonal transform are prepared by linking c and the pitch residue d that is already known. The data FR of the frame are then actually subjected to orthogonal transform that may be MDCT transform.

Figure 4A:
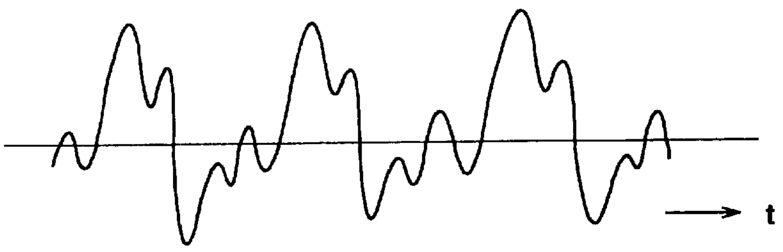
FIGS. 4A through 4C are schematic illustrations of a time base signal waveform for illustrating how the correlation of signal waveform is removed by an LPC analysis and a pitch analysis conducted on a time base input signal.
Figure 4B:
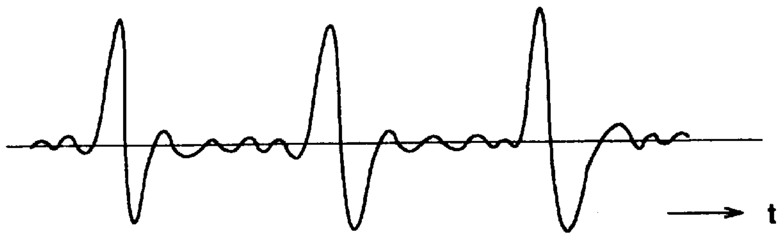
Figure 4C:
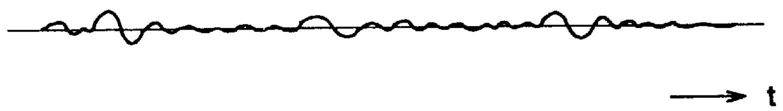
Figure 5A:
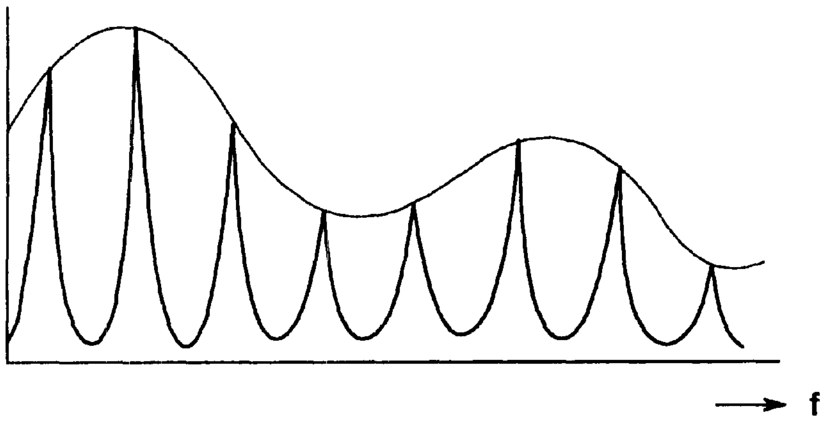
FIGS. 5A through 5C are schematic illustrations of frequency characteristics illustrating how the correlation of signal waveform is removed by an LPC analysis and a pitch analysis conducted on a time base input signal.
Figure 5B:
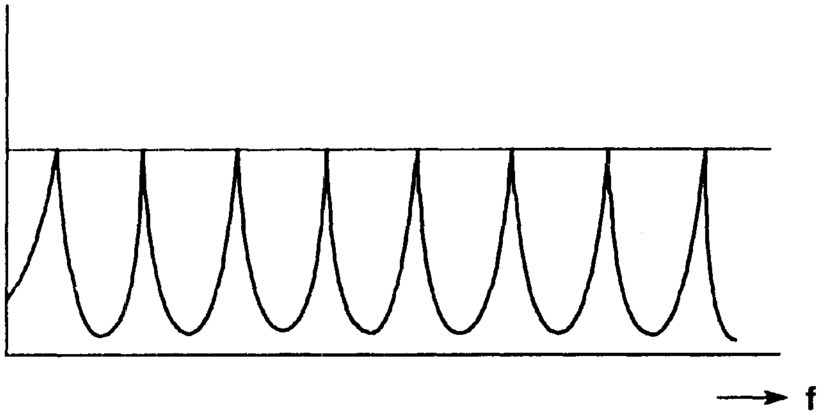
Figure 5C:
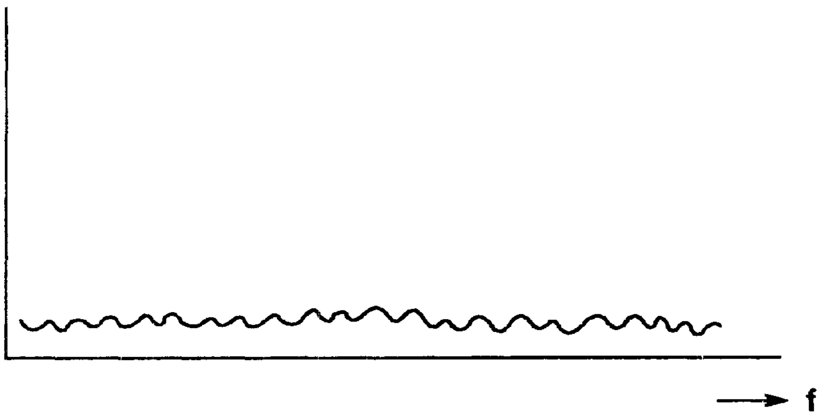

FIGS. 4A through 4C are schematic illustrations of a time base signal waveform for illustrating how the correlation of signal waveform is removed by an LPC analysis and a pitch analysis conducted on a time base input signal. FIG. 5 are schematic illustrations of frequency characteristics illustrating how the correlation of signal waveform is removed by an LPC analysis and a pitch analysis conducted on a time base input signal. More specifically, FIG. 4(A) shows the waveform of the input signal and FIG. 5(A) shows the frequency spectrum of the input signal. Then, the characteristic traits of the waveform are extracted and removed by using an LPC inverse filter formed on the basis of the LPC analysis to produce a time base waveform (LPC residue waveform) showing the form of a substantially periodical pulse as shown in FIG. 4(B). FIG. 5(B) shows the frequency spectrum corresponding to the LPC residue waveform. Then, the pitch components are extracted and removed from the LPC residue by using a pitch inverse filter formed on the basis of the pitch analysis to produce a time base signal that resembles white noise (noise-like) as shown in FIG. 4(C). FIG. 5(C) shows the frequency spectrum corresponding to the time base signal of FIG. 4(C).

In the above embodiment of the invention, the gains of the data within the frame are smoothed by means of the normalization (whitening) circuit section 11. This is an operation of extracting an envelope from the time base waveform in the frame (the residue of the pitch inverse filter 13 of this embodiment) by means of the envelope extraction circuit 17, sending the extracted envelope to envelope quantizer 20 by way of switch 19 and dividing the time base waveform (the residue of the pitch inverse filter 13) by the value of the quantized envelope by means of the divider 14 to produce a signal smoothed on the time base. The signal produced by the divider 14 is sent to the downstream orthogonal transform circuit section 25 as output of the normalization (whitening) circuit section 11.

With this smoothing operation, it is possible to realize a noise-shaping of causing the size of the quantization error produced when inversely transforming the quantized orthogonal transform coefficients into a temporal signal to follow the envelope of the original signal.

Now, the operation of extracting an envelope of the envelope extraction circuit 17 will be discussed below. If the signal supplied to the envelope extraction circuit 17, which is the residue signal normalized by the LPC inverse filter 12 and the pitch inverse filter 13, is expressed by x(n), n=0~N−1 (N being the number of samples of a frame FR, or the orthogonal transform window size, e.g., N=1,024), the value of rms (root mean square) of the sub-blocks or the sub-frames produced by dividing it by a length M shorter than the transform window size N, e.g., M=N/8, is used for the envelope. In other words, the value of rms of the i-th sub-block (i=0~M−1) that is normalized is defined by formula (1) below.

$$rms_i = \sqrt{\frac{\dfrac{\sum_{k=0}^{M-1} x(iM+k)x(iM+k)}{M}}{\dfrac{\sum_{k=0}^{N-1} x(k)x(k)}{N}}} \tag{1}$$

Then, each of $rms_i$ obtained from formula 1 can be scalar-quantized or $rms_i$ can be collectively vector-quantized as a single vector. In this embodiment, $rms_i$ is collectively vector-quantized and the index is taken out form terminal 21 as parameter to be used for the purpose of time base gain control or as envelope index and transmitted to the decoder.

The quantized $rms_i$ of each sub-block (sub-frame) is expressed by $qrms_i$ and the input residue signal x(n) is divided by $qrms_i$ by means of the divider 14 to obtain signal $x_g$ (n) that is smoothed on the time base. If, of the values of $rms_i$ obtained in this way, the ratio of the largest one to the smallest one is equal to or greater than a predetermined value (e.g., 4), they are subjected gain control as described above and a predetermined number of bits (e.g., 7 bits) are allocated for the purpose of quantizing the parameters (the above described envelope indexes). However, if the ratio of the largest one to the smallest one of the values of $rms_i$ of each sub-block (sub-frame) of the frame is smaller than the predetermined value, they are allocated for the purpose of quantization of other parameters such as frequency base parameters (orthogonal transform coefficient data). The judgment if a gain control operation is carried out or not is made by gain control on/off judgment circuit 18 and the result of the judgment (gain control switch SW) is transmitted as switching control signal to the input side switch 19 of the envelope quantization circuit 20 and also to the coefficient quantization circuit 45 in the coefficient quantization section 40, which will be described in greater detail hereinafter, and used for switching from the number of bits allocated to the coefficient for the on state of the gain control to the coefficient for the off state of the gain control or vice versa. The result of the judgment (gain control switch SW) of the gain control on/off judgment circuit is also taken out byway of terminal 22 and sent to the decoder.

The signals $x_s$ (n) that are controlled (compressed) for the gain by the divider 14 and smoothed on the time base are then sent to the orthogonal transform circuit section 25 as output of the normalization circuit section 11 and transformed into frequency base parameters (coefficient data) typically by means of MDCT. The orthogonal transform circuit section 25 comprises a windowing circuit and an MDCT circuit 27. In the windowing circuit 26 they are subjected to a window-placing operation of a window function that can utilize aliasing cancellation of MDCT on the basis of 1/2 frame overlap.

When decoding the signal at the side of the decoder, the decoder inversely quantizes the transmitted quantization indexes of the frequency base parameters (e.g., MDCT coefficients). Subsequently, an operation of overlap-addition and a operation (gain expansion or gain restoration) that is inverse relative to the smoothing operation for encoding are conducted by using the inversely quantized time base gain control parameters. It should be noted that the following process has to be followed when the technique of gain smoothing is used because no overlap-addition can be used by utilizing an virtual window, with which the square sum of the window value of an ordinarily symmetric and overlapping position is held to a constant value.

Figure 6:
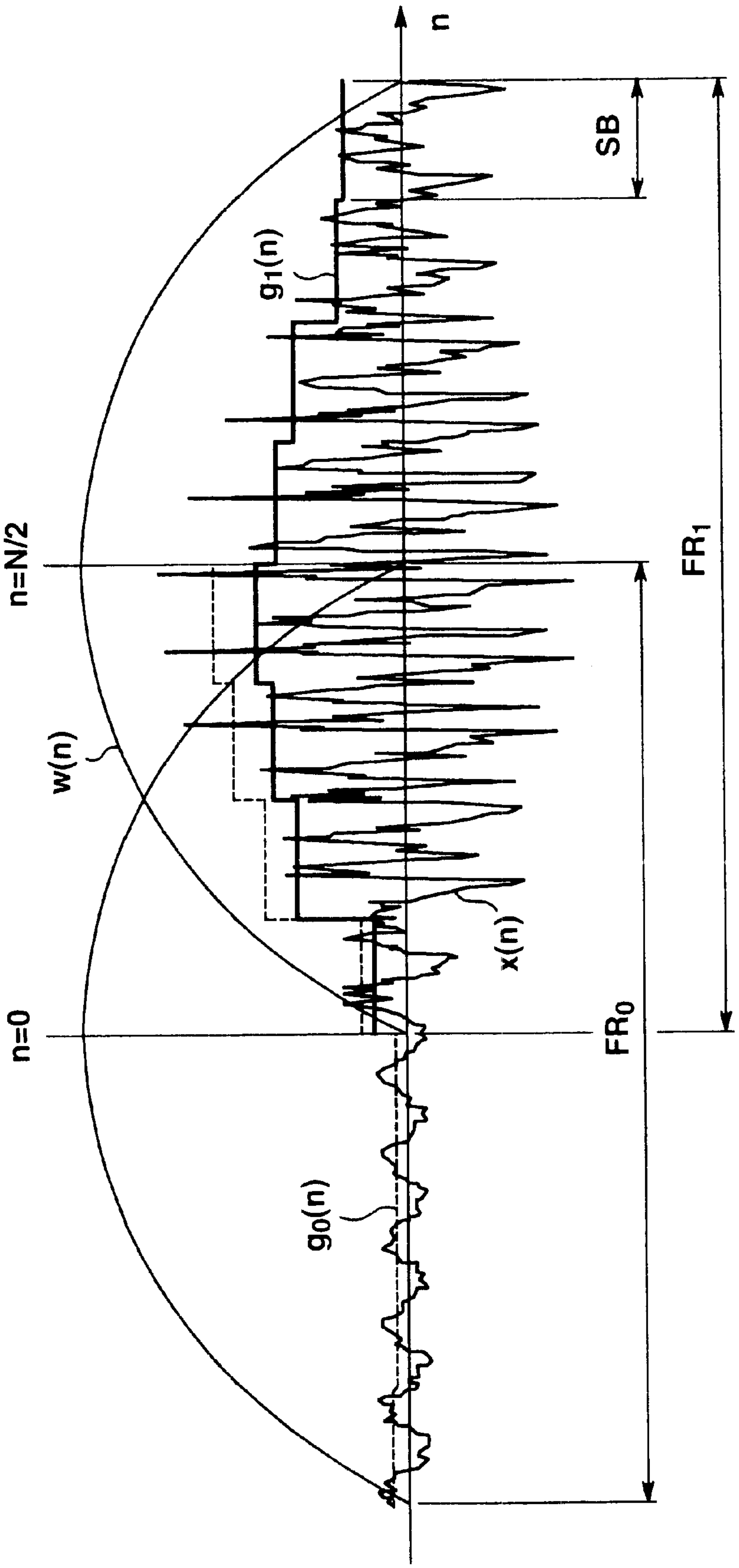
FIG. 6 is a schematic illustration of a time base input signal illustrating an overlap-addition of a decoder.

FIG. 6 is a schematic illustration of a time base input signal illustrating an overlap-addition and gain control of a decoder. Referring to FIG. 6, w(n), n=0~N−1 represents an analysis/synthesis window and g(n) represents time base gain control parameters. Thus, $$g(n)=qrms_j$$

(where j satisfies $jM \leqq n \leqq (j+1)M$), where $g_1$ (n) is g(n) of the current frame $FR_1$ and $g_0$ (n) is g (n) of the immediately preceding frame $FR_0$. In FIG. 6, each frame is divided into eight sub-frames SB (M=8).

Since analysis window w ((N/2)−1−n) is placed on the data of the latter half of the immediately preceding frame $FR_0$ for MDCT after the subtraction using $g_0$ (n+(N/2)) for the purpose of gain control at the side of the encoder, the signal obtained by placing analysis window w((N/2)−1−n), which is the sum P(n) of the principal component and the aliasing component, after inverse MDCT at the side of the decoder is expressed by formula (2) below.

$$P(n) = w\left(\frac{N}{2}-1-n\right)w\left(\frac{N}{2}-1-n\right)\frac{1}{g_0\left(n+\frac{N}{2}\right)}x(n) + w(n)w\left(\frac{N}{2}-1-n\right)\frac{1}{g_0(N-1-n)}x\left(\frac{N}{2}-1-n\right) \quad (2)$$

Additionally, analysis window w(n) is placed on the data of the former half of the current frame $FR_1$ for MDCT after the subtraction using $g_0$(n) for the purpose of gain control at the side of the encoder, the signal obtained by placing analysis window w(n), which is the sum Q(n) of the principal component and the aliasing component, after inverse MDCT at the side of the decoder expressed by formula (3) below.

$$Q(n) = w(n)w(n)\frac{1}{g_1(n)}x(n) - w\left(\frac{N}{2}-1-n\right)w(n)\frac{1}{g_1\left(\frac{N}{2}-1-n\right)}x\left(\frac{N}{2}-1-n\right) \quad (3)$$

Therefore, x(n) to be reproduced can be obtained by formula (4) below.

$$x(n) = \frac{\dfrac{P(n)}{g_1\left(\frac{N}{2}-1-n\right)} + \dfrac{Q(n)}{g_0(N-1-n)}}{w\left(\frac{N}{2}-1-n\right)w\left(\frac{N}{2}-1-n\right)\dfrac{1}{g_0\left(n+\frac{N}{2}\right)g_1\left(\frac{N}{2}-1-n\right)} + w(n)w(n)\dfrac{1}{g_0(N-1-n)g_1(n)}} \quad (4)$$

Thus, by placing windows in a manner as described below and carrying out gain control operations using the rms of each sub-block (sub-frame) as envelope, the quantization noise such as pre-echo that is harsh to the human ear can be reduced relative to a sound that changes quickly with time, a tune having an acute attack or sound that quickly attenuates from peak to peak.

Then, the MDCT coefficient data obtained by the MDCT operation of the MDCT circuit 27 of the orthogonal transform circuit section 25 are sent to the frame gain normalization circuit 43 and the frame gain calculation/quantization circuit 47 of the coefficient quantization section 40. The coefficient quantization section 40 of this embodiment firstly calculate the frame gain (block gain) of the entire coefficients of a frame, which is an MDCT transform block, and normalizes the gain. Then, it divides it into critical bands, or sub-bands of which a band with a higher pitch level has a greater width as in the case of the human hearing sense, computationally determines the Bark scale factor for each band and carries out a normalizing operation once again by using the obtained scale factor. The value that can be used for the Bark scale factor may be the peak value of the coefficients within each band or the square mean root (rms) of the coefficients. The Bark scale factors of the bands are collectively vector-quantized.

More specifically, the frame gain calculation/quantization circuit 47 of the coefficient quantization section 40 computationally determines and quantizes the gain of each frame, which is an MDCT transform block as described above and the obtained code book index (frame gain index) is taken out by way of terminal 55 and sent to the decoder, while the frame gain of the quantized value is sent to the frame gain normalization circuit 43, which normalizes the value by dividing the input by the former. The output normalized by the frame gain is then sent to the Bark scale factor calculation/quantization circuit 42 and the Bark scale factor normalization circuit 44.

The Bark scale factor calculation/quantization circuit 42 computationally determines and quantizes the Bark scale factor of each critical band , which scale factor is then taken out by way of terminal 54 and sent to the decoder. At the same time, the quantized Bark scale factor is sent to the bit allocation calculation circuit 41 and the Bark scale factor normalization circuit 44. The Bark scale factor normalization circuit 44 normalizes the coefficients of each critical band and the coefficients normalized by means of the Bark scale factor are sent to the coefficient quantization circuit 45.

In the coefficient quantization circuit 45, a given number of bits are allocated to each coefficient according to the bit allocation information sent from the bit allocation calculation circuit 41. At this time, the overall number of the allocated bits is switched according to the gain control SW information sent from the above described gain control on/off judgment circuit 18. In the case of vector-quantization. this arrangement can be realized by preparing two different code books, one for the on state of gain control and the other for the off state of gain control, and selectively using either of them according to the gain control switch information.

Now, the operation of bit allocation of the bit allocation calculation circuit 41 will be described. Firstly, the weight to be sued for quantizing each MDCT coefficient is computationally determined by means of the LPC coefficients, the pitch parameters or the Bark scale factors obtained in a manner as described above. Then, the number of bits to be allocated to each and every MDCT coefficient of the entire bands is determined and the MDCT coefficient is quantized. Thus, the weight can be regarded as noise-shaping factor and made to show desired noise-shaping characteristics by modifying each of the parameters. As an example, weights W(ω) are computationally determined by using only LPC coefficients, pitch parameters and Bark scale factors as expressed by formulas below.

$$W(\omega)=H(\omega)P(\omega)S(\omega)$$

where H(ω) and P(ω) are frequency responses of transfer functions H(z) and P(z), $$H(z)=\frac{1+\sum_{i=1}^{20}\gamma^{i}\alpha_{i}z^{-i}}{1+\sum_{i=1}^{20}\lambda^{i}\alpha_{i}z^{-i}} \tag{5}$$

(weight obtained by using LPC coefficients)

$$\gamma=0.9,\quad \lambda=0.8$$

$$P(z)=\frac{1}{1+\sum_{i=-1}^{1}\mu g_{i}z^{-k+i}}$$

(weight obtained by using pitch parameters)

$$\mu=0.9$$

$$S(\omega)=rms_{i}(\omega\subset bark_{i})$$

(weight obtained by using Bark scale factors)

Thus, the weights to be used quantization are determined by using only LPC coefficients, pitch coefficients or Bark scale factors so that it is sufficient for the encoder to transmit the parameters of the above three types to the decoder to make the latter reproduce the bit allocation of the encoder without transmitting any other bit allocation information so that the rate of transmitting side information can be reduced.

Now the quantizing operation of the coefficient quantization circuit 45 will be described by way of an example illustrated in FIGS. 1B, 7A through 7C and 8.

FIG. 1B is a schematic block diagram of an exemplary coefficient quantization circuit 45 shown in FIG. 2. Normalized coefficient data (e.g., MDCT coefficients) y ae fed from the Bark scale factor normalization circuit 44 of FIG. 2 to input terminal 1. Weight calculation circuit 2 is substantially equal to the bit allocation calculation circuit 41 of FIG. 2. To be more accurate, it is realized by taking out the portion adapted to calculate the weights to be used for allocating quantization bits out of the latter. The weight calculation circuit 2 computationally determines the weights to be used for bit allocation on the basis of LPC coefficients, pitch parameters and Bark scale factors. Note that the coefficient of a frame is expressed by vector y and the weight of the frame is expressed by vector w.

Figure 7A:
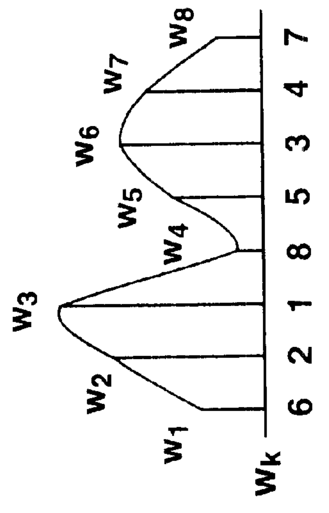
FIGS. 7A through 7C are schematic illustrations of a sorting operation based on the weights of coefficients within a band obtained by dividing coefficient data.
Figure 7B:
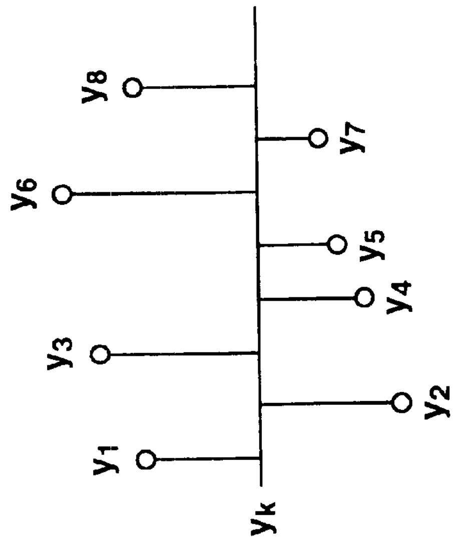
Figure 7C:
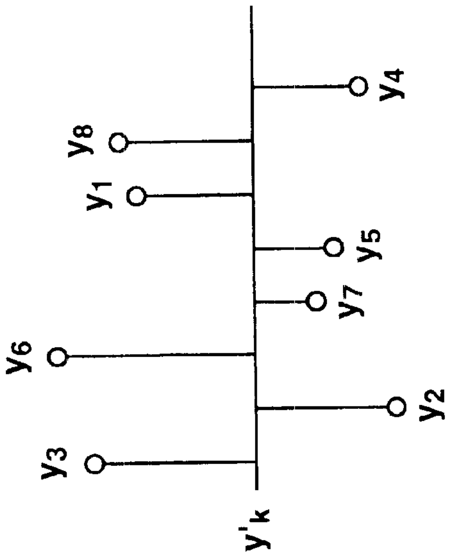
Figure 8:
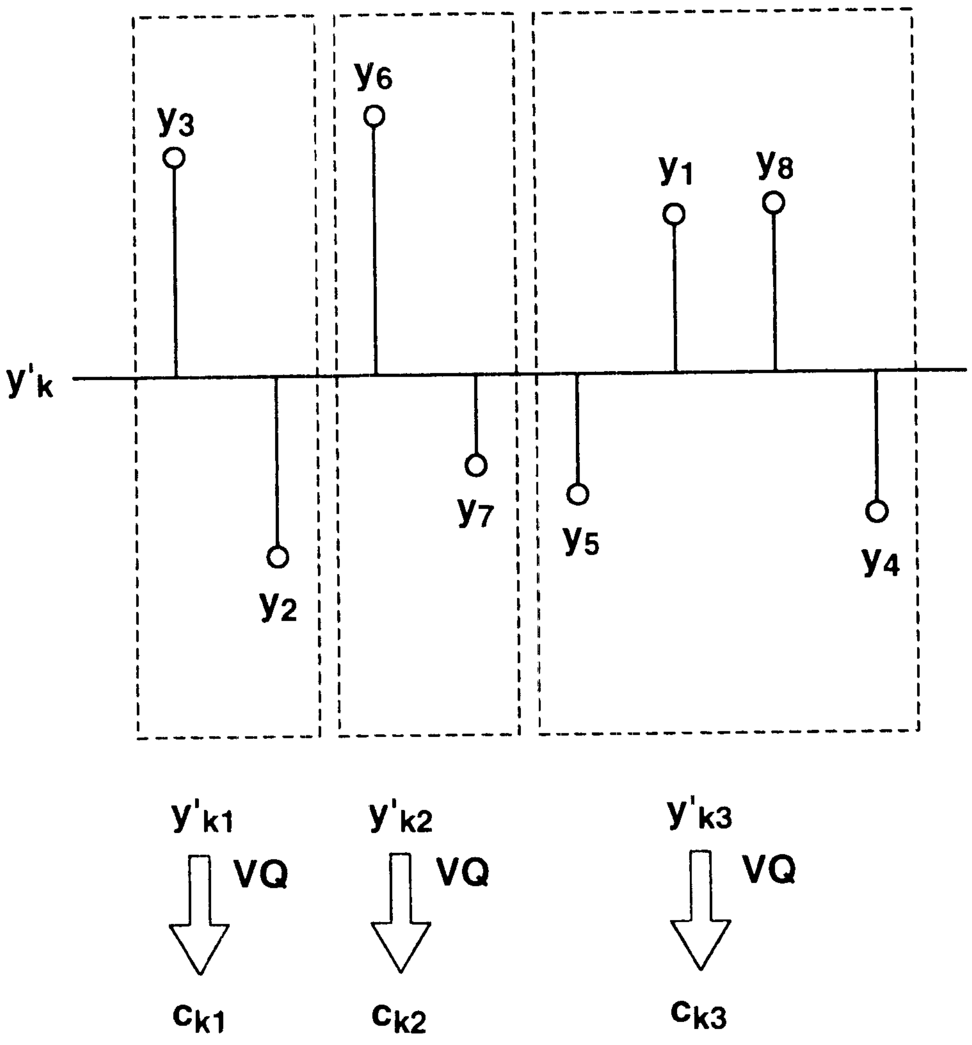
FIG. 8 is a schematic illustration of an operation of vector-quantization of dividing each coefficient sorted out according to the weight within a band obtained by dividing coefficient data into sub-vectors.

FIGS. 7A through 7C are schematic illustrations of a sorting operation based on the weights of coefficients within a band obtained by dividing coefficient data. FIG. 7A shows the weight vector $w_k$ of the k-th band and FIG. 7B shows the coefficient vector $y_k$ of the k-th band. In FIGS. 7A through 7C, the k-th band contains a total of eight elements and the eight weights that are the elements of the weight vector $w_k$ are expressed respectively by $w_1, w_2, \ldots, w_8$, whereas the eight coefficients that ae the elements of the coefficient vector $y_k$ are expressed respectively by $y_1, y_2, \ldots, y_8$. In the example of FIGS. 7A and 7B, the weight $w_3$ corresponding to the coefficienty $y_3$ has the greatest value of all and followed by the remaining weights that can be arranged in the descending order of $w_2, w_6, \ldots, w_4$. Then, the coefficients $y_1, y_2, \ldots, y_8$ are rearranged (sorted) to the corresponding order of $y_3, y_2, y_6, \ldots, y_4$. FIG. 7C shows the collective coefficient vector of $y'_k$.

Then, the coefficient vectors $y'_0, y'_1, \ldots, y'_{L-1}$ of the respective bands that are sorted in the descending order of the corresponding weights are sent to the respective vector quantizers $\mathbf{5}_0, \mathbf{5}_1, \ldots, \mathbf{5}_{L-1}$ for vector-quantization. Preferably, the number of bits allocated to each of the bands is preselected so that the number of quantization bits allocated to each band may not fluctuate if the energy of the band changes.

As for the operation of vector-quantization, if the number of elements of each band is large, they may be divided into a number of sub-vectors and the operation of vector-quantization may be carried out for each sub-vector. In other words, after sorting the coefficient vectors of the k-th band, the coefficient vector $y'_k$ is divided into a number of sub-vectors as shown in FIG. 8, the number being equal to the predetermined number of elements. If the number is equal to three, the coefficient vector $y'_k$ will be divided into three sub-vectors $y'_{k1}, y'_{k2}, y'_{k3}$, each of which is then vector-quantized to obtain code book indexes $c_{k1}, c_{k2}, c_{k3}$. The indexes $c_{k1}, c_{k2}, c_{k3}$ of the k-th band is collectively expressed by vector $c_k$. The operation of quantizing the sub-vectors can be carried out in the descending order of the weights by allocating more quantization bits to a vector located closer to the leading vector. In FIG. 8, for example, the sub-vectors $y'_{k1}, y'_{k2}, y'_{k3}$ can be arranged in the descending order without changing the current order by allocating 8 bits to the sub-vector $y'_{k1}$, 6 bits to the sub-vector $y'_{k2}$ and 4 bits to the sub-vector $y'_{k3}$. In other words, bits are allocated in the descending order of the weights.

Then, the vectors $c_0, c_1, \ldots, c_{L-1}$ of the coefficient indexes of each band obtained from the respective vector quantizer $\mathbf{5}_0, \mathbf{5}_1, \ldots, \mathbf{5}_{L-1}$ are collectively taken out by way of terminal 6 as vector c of the coefficient indexes of all the bands. Note that the terminal 6 corresponds to the terminal 51 of FIG. 2.

In the example of FIGS. 1B, 7A through 7C and 8, the orthogonally transformed coefficients on the frequency base (e.g., MDCT coefficients) are sorted by means of above described weights and rearranged in the descending order of the numbers of allocated bits (so that a coefficient located close to the leading coefficient is allocated with a larger number of bits). However, alternatively, only the indexes indicating the positions or the order of the coefficients on the frequency base obtained through orthogonal transform may be sorted in the descending order of said weights and the accuracy quantization of each coefficient (the number of bits allocated to it) may be determined as a function of the corresponding indexes. While vector quantization is used for quantizing the coefficients in the above described example, the present invention can alternatively be applied to an operation of scalar quantization or that of quantization using both scalars and vectors.

Now, an embodiment of audio signal decoder that corresponds to the audio signal encoder of FIG. 2 will be described by referring to FIG. 9.

Figure 9:
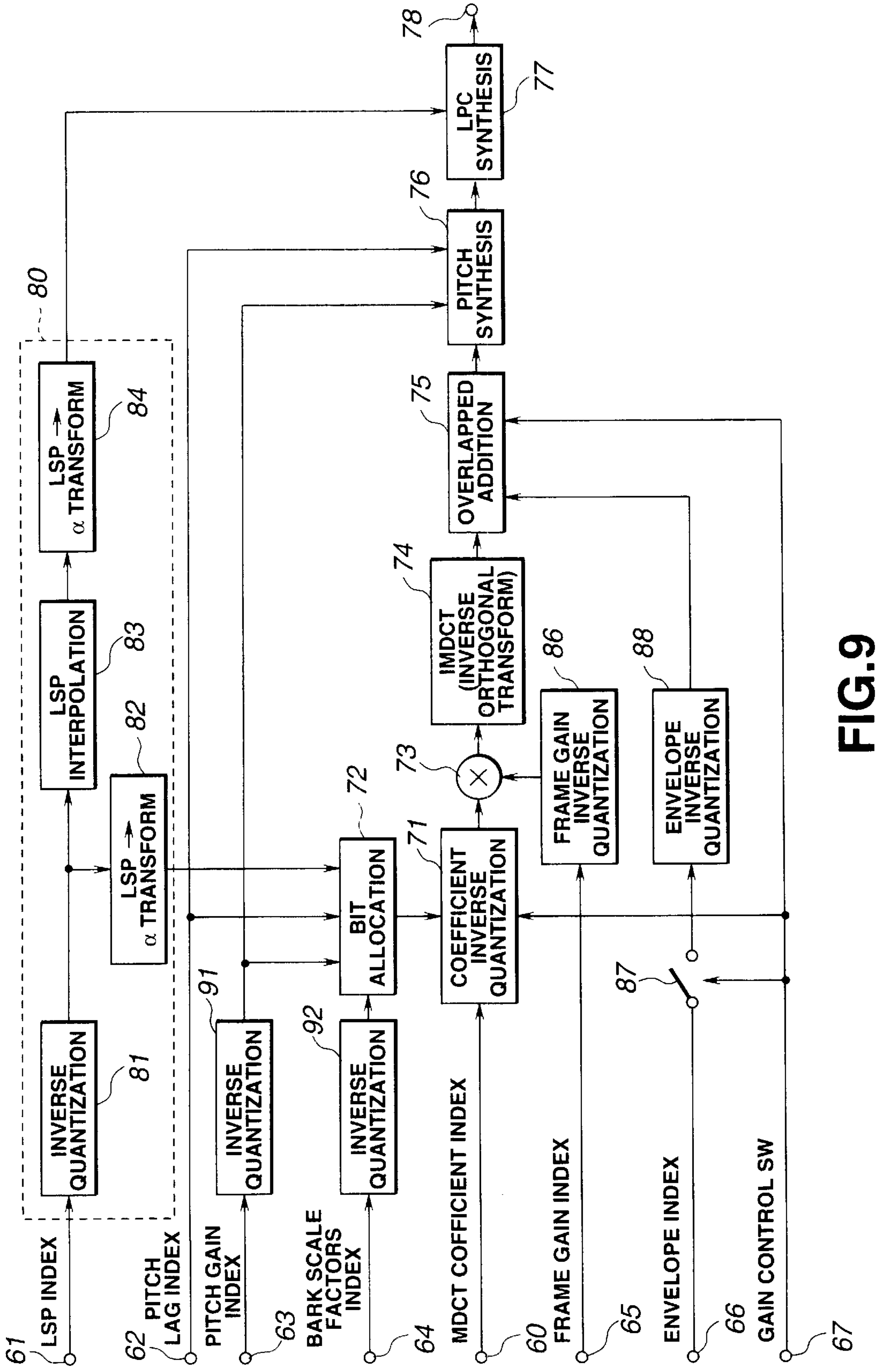
FIG. 9 is a schematic block diagram of an embodiment of audio signal decoder corresponding to the audio signal encoder of FIG. 2.

In FIG. 9, input terminals 60 through 67 are fed with data from the corresponding respective output terminals of FIG. 2. More specifically, the input terminal 60 of FIG. 9 is fed with indexes of orthogonal transform coefficients (e.g., MDCT coefficients) from the output terminal 51. Similarly, the input terminal 61 is fed with LSP indexes from the output terminal 31 of FIG. 2. The input terminals 62 through 65 are fed respectively with data, or pitch lag indexes, pitch gain indexes, Bark scale factors and frame gain indexes from the corresponding respective output terminals 52 through 55 of FIG. 2. Likewise, the input terminals 66 and 67 are fed respectively with envelope indexes and gain control SW information from the corresponding respective output terminals 21 and 22 of FIG. 2.

The coefficient indexes sent from the input terminal 60 are inversely quantized by coefficient inverse quantization circuit 71 and sent to inverse orthogonal transform circuit 74 for IMDCT (inverse MDCT) by way of multiplier 73.

The LSP indexes sent from the input terminal 61 are sent to inverse quantizer5 81 of LPC parameter reproduction section 80 and inversely quantized to LSP data by the section 80 and the output of the section 80 is sent to LSP→α transform circuit 82 and LSP interpolation circuit 83. The α parameters (LPC coefficients) from the LSP→α transform circuit 82 are sent to bit allocation circuit 72. The LSP data from the LSP interpolation circuit 83 are transformed into a parameters (LPC coefficients) by LSP→α transform circuit 84 and sent to LPC synthesis circuit 77.

The bit allocation circuit 72 is supplied with pitch lags from the input terminal 62, pitch gains from the input terminal 63 coming by way of inverse quantizer 91 and Bark scale factors from the input terminal 64 coming by way of inverse quantizer 92 in addition to said LPC coefficients from the LSP→α transform circuit 82. Then, the decoder can reproduce the bit allocation of the encoder only on the basis of the parameters. The bit allocation information from the bit allocation circuit 72 is sent to coefficient inverse quantizer 71, which uses the information for determining the number of bits allocated to each coefficient for quantization.

The frame gain indexes from the input terminal 65 are sent to frame gain inverse. quantizer 86 and inversely quantized. The obtained frame gain is then sent to multiplier 73.

The envelope index from the input terminal 66 is sent to envelope inverse quantizer 88 by way of switch 87 and inversely quantized. The obtained envelope data are then sent to overlapped addition circuit 75. The gain control SW information from the input terminal 67 is sent to the coefficient inverse quantizer 71 and the overlapped addition circuit 75 and also used as control signal for the switch 87. Said coefficient inverse quantizer 71 switches the total number of bits to be allocated depending on the on/off state of the above described gain control. In the case of inverse quantization, two different code books may be prepared, one for the on state of gain control and the other for the off state of gain control, and selectively used according to the gain control switch information.

The overlapped addition circuit 75 causes the signal that is brought back to the time base on a frame by frame basis and sent from the inverse orthogonal transform circuit 74 typically for IMDCT to be overlapped by ½ frame for each frame and adds the frames. When the gain control is on, it performs the operation of overlapped addition while processing the gain control (gain expansion or gain restoration as described earlier) by means of the envelope data from the envelope inverse quantizer 88.

The time base signal from the overlapped addition circuit 75 is sent to pitch synthesis circuit 76, which restores the pitch component. This operation is a reverse of the operation of the pitch inverse filter 13 of FIG. 2 and the pitch lag from the terminal 62 and the pitch gain from the inverse quantizer 91 are used for this operation.

The output of the pitch synthesis circuit 76 is sent to the LPC synthesis circuit 77, which carries out an operation of LPC synthesis that is a reverse of the operation of the LPC inverse filter 12 of FIG. 2. The outcome of the operation is taken out from output terminal 78.

Figure 10:
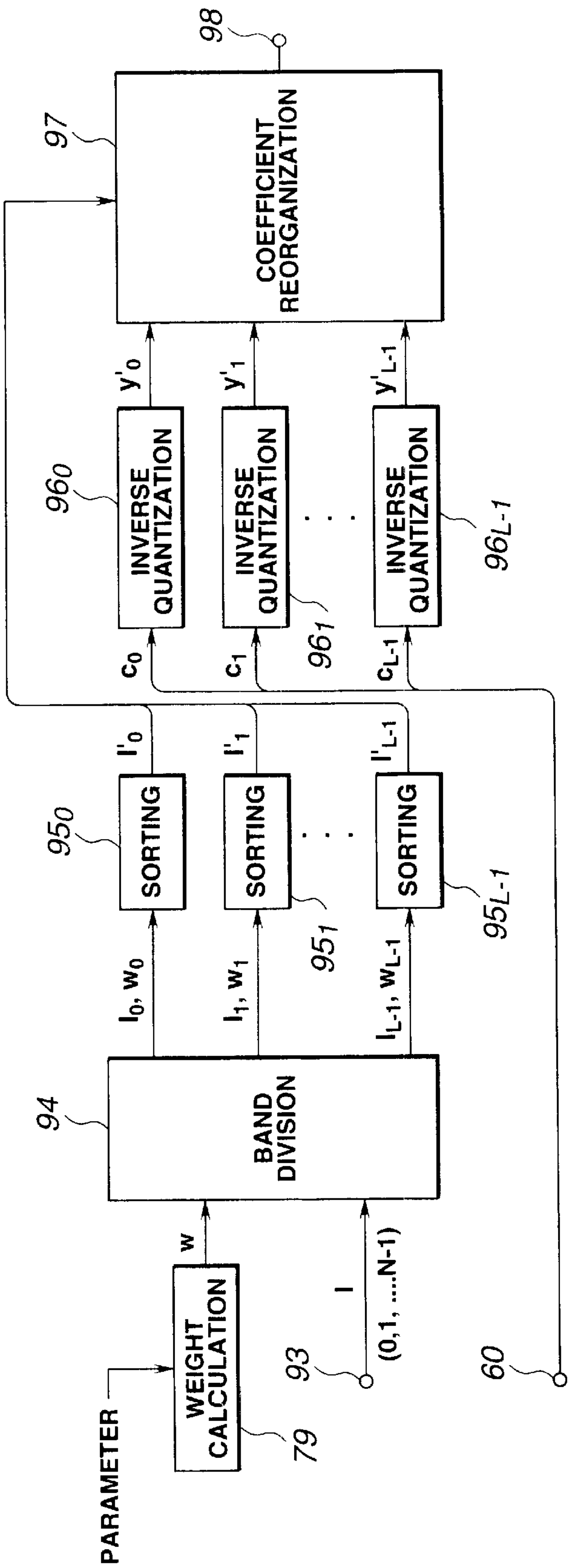
FIG. 10 is a schematic block diagram of an inverse quantization circuit that can be used for the audio signal decoder of FIG. 9.

If the coefficient quantization circuit 45 of the coefficient quantization section 40 of the encoder has a configuration adapted to vector-quantize the coefficients that are sorted for each band according to the allocated weights as shown in FIG. 7 (?), the coefficient inverse quantization circuit 71 may have the configuration shown in FIG. 10.

Referring to FIG. 10, input terminal 60 corresponds to the input terminal of FIG. 9 and is fed with coefficient indexes (code book indexes obtained by quantizing orthogonal transform coefficients such as MDCT coefficients), whereas weight calculation circuit 79 is fed with α parameters (LPC coefficients) from the LSP→α transform circuit 82 of FIG. 9, pitch lags from input terminal 62, pitch gains from the inverse quantizer 91 and Bark scale factors from the inverse quantizer 92. The weight calculation circuit 79 computationally determines weights W(ω) by using only LPC coefficients, pitch parameters (pitch lags and pitch gains) and Bark scale factors in addition to the equation (5) above. The input terminal 92 is fed with numerical values of 0~N−1 (which are expressed by vector I) when there are indexes indicating the positions or the order of arrangement of the coefficients on the frequency base and hence there are a total of N coefficient data over the entire bands. Note that the N weights sent from the weight calculation circuit 79 for the N coefficients are expressed by vector w.

The weight w from the weight calculation circuit 79 and the index I from the input terminal 92 are sent to band dividing circuit 97, which divides each of them into L bands as in the case of the encoder. If three bands of a low band, a middle band and a high band (L=3) are used in the encoder, the band is divided into three bands also in the decoder. Then, the indexes and the weights of the three bands are respectively sent to sorting circuits $\mathbf{95}_0$, $\mathbf{95}_1$, . . . , $\mathbf{95}_{L-1}$ For example, index $I_k$ and weight $w_k$ of the k-th band. In the sorting circuit $\mathbf{95}_k$, the index $I_k$ in the k-th band are rearranged (sorted) according to the order of arrangement of the weights $w_k$ of the coefficients and the sorted index $I'_k$ are output. The sorted index $I_0, I_1, \ldots, I_{L-1}$ sorted for each band by the respective sorting circuits $\mathbf{95}_0$, $\mathbf{95}_1$, . . . , $\mathbf{95}_{L-1}$ are then sent to coefficient reorganization circuit 97.

The indexes of the orthogonal coefficients from the input terminal 60 are obtained during the quantizing operation of the encoder in such a way that the original band is divided into L bands and the coefficients are sorted in the descending order of the weights in each-band and vector-quantized for each of the sub-vectors obtained according to a predetermined rule in the band. More specifically, the sets of coefficient indexes of each of a total of L bands are expressed respectively by vectors $c_0, c_1, \ldots, c_{L-1}$, which are then sent to respective inverse quantizers 95$_0$, 95$_1$, . . . , 95$_{L31\ 1}$. The coefficient data obtained by the inverse quantizers 95$_0$, 95$_1$, . . . , 95$_{L-1}$ as a result of inverse quantization correspond to those that are sorted in the descending order of the weights in each band, or the coefficient vectors $y'_0$, $y'_1, \ldots, y'_{L-1}$ from the sorting circuits 4$_0$, 4$_1$, . . . , 4$_{L-1}$ as shown in FIG. 1B so that the order or arrangement is different from that of arrangement on the frequency base. Thus, the coefficient reorganization circuit 97 is adapted to sort the indexes I in advance in the descending order of the weights and restores the original order on the frequency base by making the sorted indexes correspond to the respective coefficient data obtained by the above inverse quantization. In short, the coefficient reorganization circuit 97 retrieves the coefficient data y showing the original order of arrangement on the frequency base by making the sorted indexes from the sorting circuits 95$_0$, 95$_1$, . . . , 95$_{L-1}$ correspond to the respective coefficient data from the inverse quantizers 96$_0$, 96$_1$, . . . , 96$_{L-1}$ that are sorted in the descending order of the weights in each band and rearranging (inversely sorting) the coefficient data according to the sorted indexes and then it takes out the coefficient data y from output terminal 98. The coefficient data from the output terminal 98 are then sent to the multiplier 73 in FIG. 9.

Figure 11:
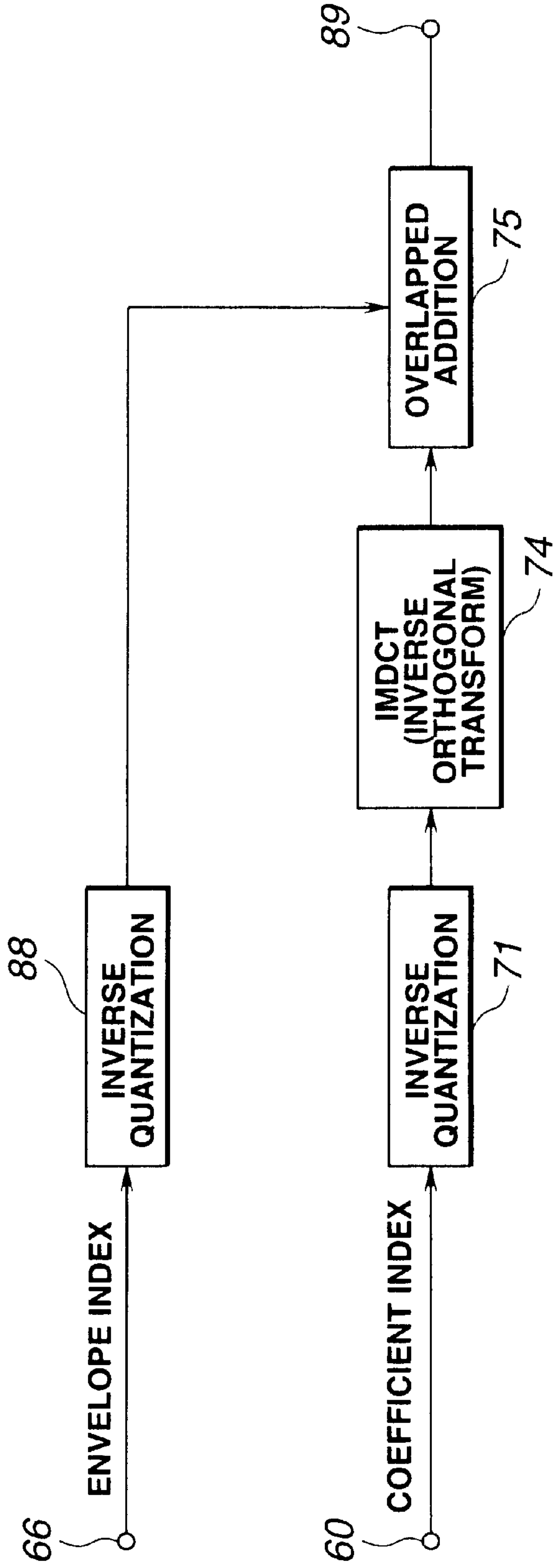
FIG. 11 is a schematic block diagram of an embodiment of decoder corresponding to the encoder of FIG. 1C.

FIG. 11 is a schematic block diagram of an embodiment of decoder corresponding to the encoder of FIG. 1C.

Figure 12:
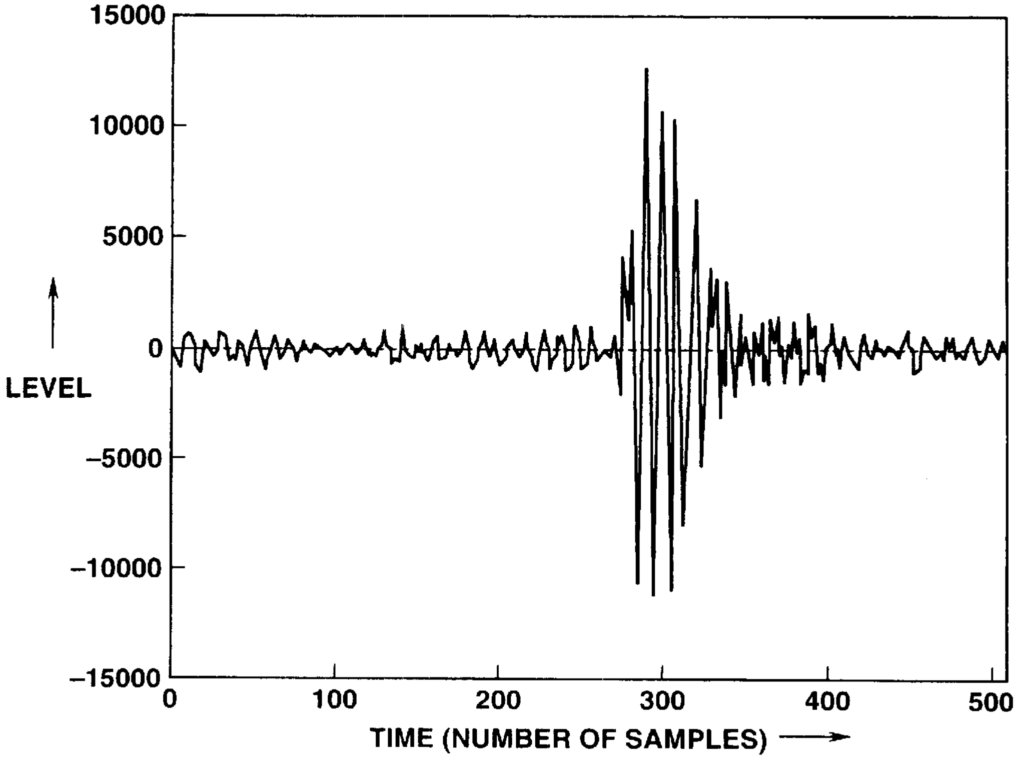
FIG. 12 is a schematic illustration of a reproduced signal waveform that can be obtained by encoding a sound of a castanet without gain control.

Referring to FIG. 12, input terminal 60 and input terminal 66 are respectively fed with coefficient indexes and envelope indexes, which are described above. The coefficient indexes of the input terminal 60 are then inversely quantized by inverse quantization circuit 71 and processed for inverse MDCT (inverse orthogonal transform) by IMDCT circuit before sent to overlapped addition circuit 75. The envelope indexes of the input terminal 66 are then inversely quantized by inverse quantizer 88 and the envelope information is sent to the overlapped addition circuit 75. The overlapped addition circuit 75 carries out an operation that is reverse to the above described gain smoothing operation (of dividing the input signal with the envelope information by means of the divider 14) and also an operation of overlapped addition in order to output a continuous time base signal from terminal 89. The signal from the terminal 89 is sent to the pitch synthesis circuit 76 of FIG. 9.

With the above described processing, the signal is subjected to a noise shaping operation along the time base so that any quantization noise that is harsh to the human ear can be reduced without switch in the transform window size.

Figure 13:
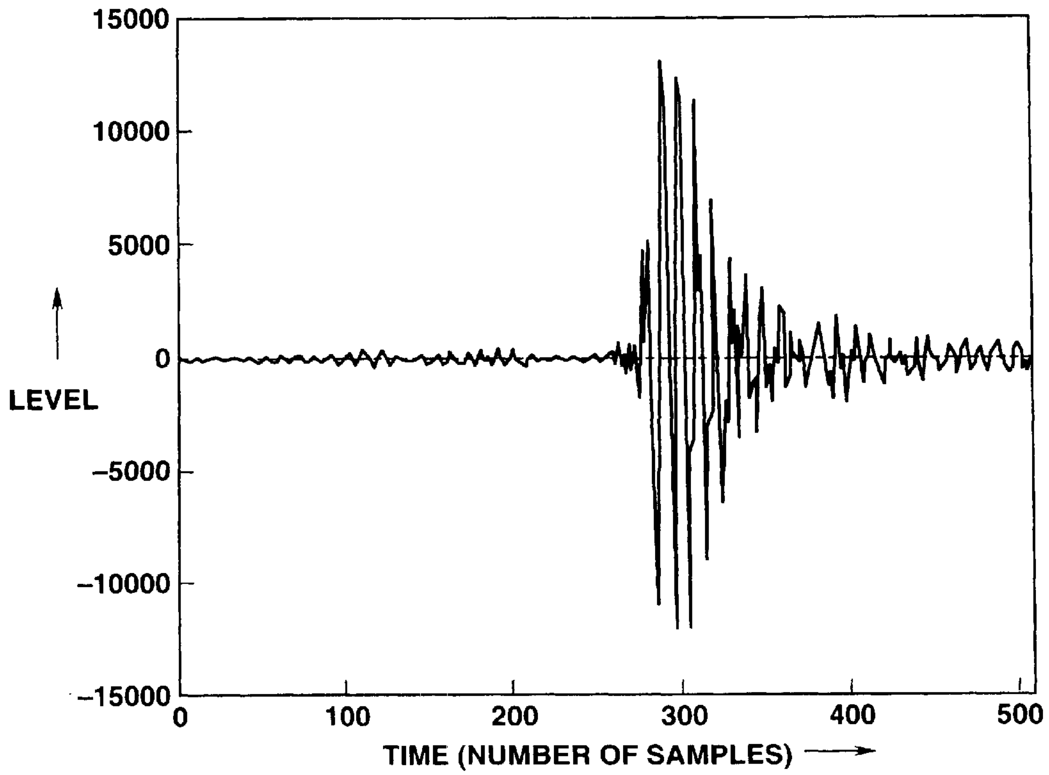
FIG. 13 is a schematic illustration of a reproduced signal waveform that can be obtained by encoding a sound of a castanet with gain control.

As an example where the present invention is applied, FIG. 12 shows a reproduced signal waveform that can be obtained by encoding a sound of a castanet without gain control, whereas FIG. 13 shows a reproduced signal waveform that can be obtained by encoding a sound of a castanet with gain control. As clearly seen from FIGS. 12 and 13, the noise prior to the attack of a tune (so-called pre-echo) can be remarkably reduced by applying gain control according to the invention.

Figure 14:
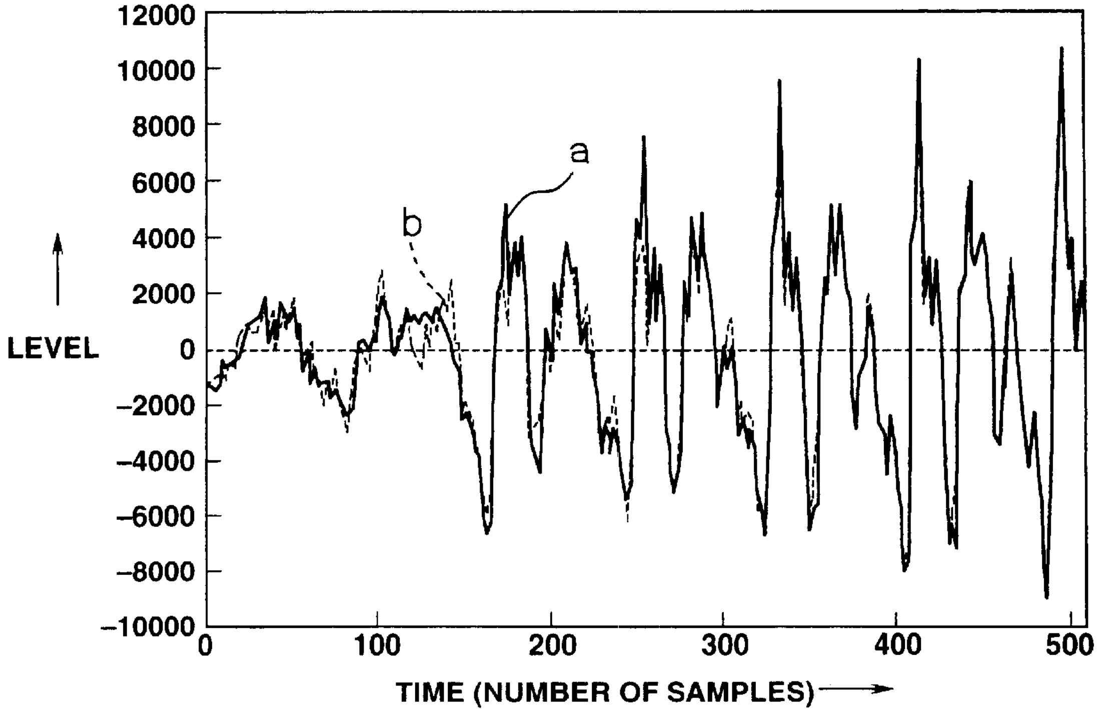
FIG. 14 is a schematic illustration of the waveform of a time base signal in an initial stage of the speech burst of part of a sound signal.
Figure 15:
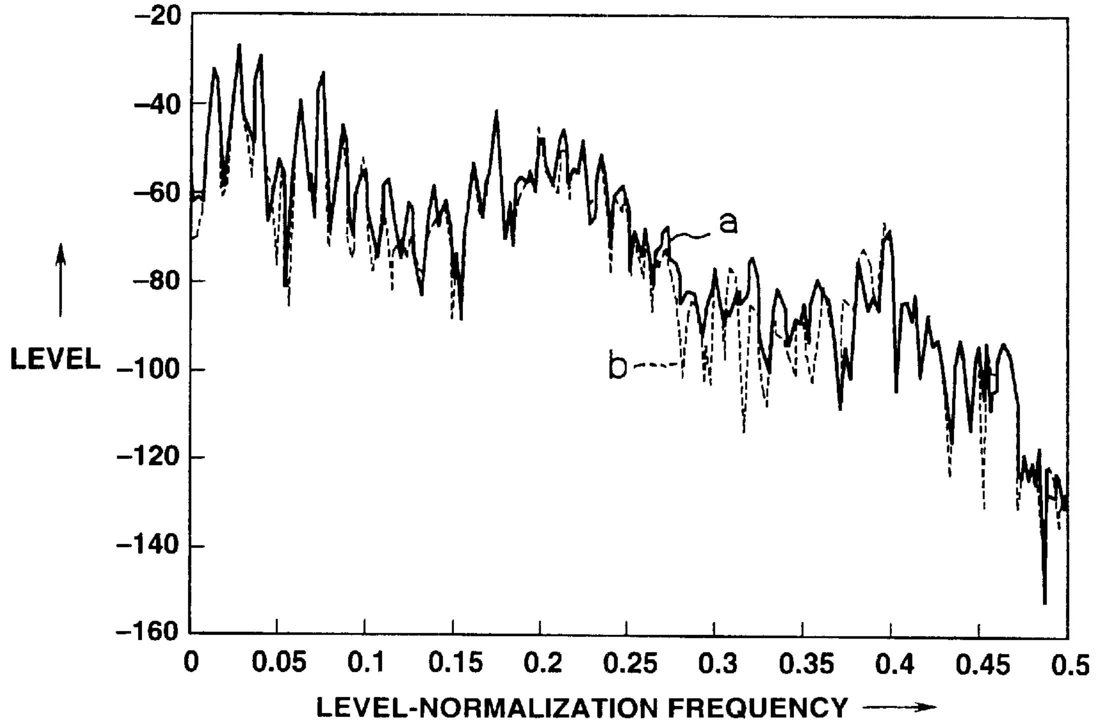
FIG. 15 is a schematic illustration of the frequency spectrum in an initial stage of the speech burst of part of a sound signal.

FIG. 14 shows the waveform of a time base signal in an initial stage of the speech burst of part of a sound signal, whereas FIG. 15 shows the frequency spectrum in an initial stage of the speech burst of part of a sound signal. In each of FIGS. 14 and 15, the curve a shows the use of gain control, whereas curve b (broken line) shows the non-use of gain control. By comparing the curves a and b, the curve a with the use of gain control clearly shows the pitch structure and hence a good reproduction performance as particularly clearly revealed in FIG. 15.

The present invention is by no means limited to the above embodiment. For example, the input time base signal may be a voice signal in the telephone frequency band or a video signal and may not be an audio signal, which may be a voice signal or a music tone signal. The configuration of the normalization circuit section 11, the LPC analysis and the pitch analysis are not limited to the above description and any of various alternative techniques such as extracting and removing the characteristic traits or the correlation of the time base input waveform by means of linear prediction or non-linear prediction may be used for the purpose of the invention. The quantizers may be scalar quantizers or scalar quantizers and vector quantizers may be coinbinedly used for the quantizers. They should not necessarily be vector quantizers.

What is claimed is:

1. A signal coding apparatus for encoding an input signal on a time base, the apparatus comprising:

normalization means for removing correlation of a waveform of said input signal and outputting an LPC prediction residual signal, wherein said normalization means comprises an LPC inverse filter for outputting said LPC prediction residual of said input signal based on LPC coefficients obtained by LPC analysis and a pitch inverse filter for removing the correlation of a pitch of said LPC prediction residual based on pitch parameters obtained by pitch analysis;

orthogonal transform means for transforming said LPC prediction residual signal into a coefficient vector;

weight calculation means for calculating weights for quantization of said coefficient vector in response to said LPC coefficients and said pitch parameters;

assigning means for assigning an order to each frequency coefficient of said coefficient vector in descending order of said weights and quantizing said coefficient vector assigned a higher order with a higher degree of precision; and quantization means for dividing said coefficient vector into sub-vectors from a frequency assigned a higher order to form sub-vectors of a shorter length than said coefficient vector and for subsequently quantizing said sub-vectors of shorter length.

2. The signal coding apparatus according to claim 1, wherein said quantization means allocates more bits to said sub-vector assigned said higher order.

3. The signal coding apparatus according to claim 1, wherein said weight calculation means includes means for calculating said weights on the basis of parameters representing statistic characteristics of the input signal.

4. The signal coding apparatus according to claim 1, wherein said orthogonal transform means transforms the input signal by modified discrete cosine transform (MDCT) into said coefficient data on a frequency base.

5. A signal coding method for encoding an input signal on a time base, the method comprising:

a normalization step for removing correlation of a waveform of said input signal and outputting an LPC residual signal, wherein said normalization step uses an LPC inverse filter for outputting said LPC prediction residual of said input signal based on LPC coefficients obtained by LPC analysis and a pitch inverse filter for removing the correlation of a pitch of said LPC prediction residual based on pitch parameters obtained by pitch analysis;

an orthogonal transform step of transforming said LPC prediction residual signal into a coefficient vector;

a weight calculation step of calculating weights for quantization of said coefficient vector in response to said LPC coefficients and said pitch parameters;

an assigning step of assigning an order to each frequency coefficient of said coefficient vector in descending order of said weights; and a quantizing step of dividing said coefficient vector into sub-vectors from a frequency coefficient of a higher order and forming smaller length sub-vectors and subsequently quantizing said smaller length sub-vectors.

6. The signal coding method according to claim 5, wherein said quantization step allocates more bits to said sub-vector assigned said higher order.

7. A signal decoding apparatus for decoding coded data obtained by performing a normalization for removing correlation of an input signal by an LPC inverse filter and a pitch inverse filter, an orthogonal transformation on a residual signal on a time base obtained by the normalization, and quantizing a coefficient vector obtained by the orthogonal transformation with different sub-vector lengths divided according to weights determined based on LPC coefficients and pitch parameters, said decoding apparatus comprising:

weight calculation means for calculating said weights on the basis of said LPC coefficients and said pitch parameters; and inverse quantization means for inversely quantizing data obtained by quantizing said coefficient vector with different lengths of sub-vectors divided according to the weights determined by said weight calculation means.

8. A signal decoding method for decoding coded data obtained by performing a normalization for removing a correlation of an input signal by an LPC inverse filter and a pitch inverse filter, by performing an orthogonal transformation on a residual signal on a time base obtained by the normalization, and by quantizing a coefficient vector obtained by the orthogonal transformation with different lengths of sub-vectors divided according to weights determined based on LPC coefficients and pitch parameters, said signal decoding method comprising:

a weight calculating step of calculating the weights based on said LPC coefficients and said pitch parameters; and an inverse quantization step of inversely quantizing said coefficient vector with different lengths of sub-vectors divided according to the weights determined in the weight calculating step.

* * * * *